United States Patent
Hsieh et al.

(10) Patent No.: US 9,019,626 B2
(45) Date of Patent: Apr. 28, 2015

(54) PHOTOGRAPHING LENS ASSEMBLY

(71) Applicant: Largan Precision Co., Ltd., Taichung (TW)

(72) Inventors: Dung-Yi Hsieh, Taichung (TW); Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 32 days.

(21) Appl. No.: 13/888,376

(22) Filed: May 7, 2013

(65) Prior Publication Data

US 2014/0320981 A1    Oct. 30, 2014

(30) Foreign Application Priority Data

Apr. 25, 2013    (TW) .............................. 102114858 A

(51) Int. Cl.
*G02B 9/62* (2006.01)
*G02B 13/00* (2006.01)
*G02B 13/04* (2006.01)

(52) U.S. Cl.
CPC .............. *G02B 13/0045* (2013.01); *G02B 9/62* (2013.01); *G02B 13/04* (2013.01)

(58) Field of Classification Search
CPC .............................. G02B 9/62; G02B 13/0045
USPC ........................... 359/658, 713, 754, 756–760
See application file for complete search history.

(56) References Cited

U.S. PATENT DOCUMENTS

| | | | |
|---|---|---|---|
| 7,869,142 B2 | 1/2011 | Chen et al. | |
| 8,000,031 B1 | 8/2011 | Tsai | |
| 8,390,940 B2 | 3/2013 | Tsai et al. | |
| 2013/0215520 A1* | 8/2013 | Lai et al. ........................ | 359/713 |
| 2013/0314804 A1* | 11/2013 | Kubota et al. ................. | 359/757 |
| 2014/0063616 A1 | 3/2014 | Okano et al. | |
| 2014/0071543 A1 | 3/2014 | Shinohara | |

FOREIGN PATENT DOCUMENTS

WO    2014006822 A1    1/2014

* cited by examiner

*Primary Examiner* — Darryl J Collins
(74) *Attorney, Agent, or Firm* — CKC & Partners Co. Ltd.

(57) ABSTRACT

A photographing lens assembly includes, in order from an object side to an image side, a first lens element, a second lens element, a third lens element, a fourth lens element, a fifth lens element and a sixth lens element. The first lens element with positive refractive power has a convex object-side surface at a paraxial region. The second through the sixth lens elements have refractive power. The fourth lens element has a concave object-side surface at a paraxial region and a convex image-side surface at a paraxial region. The fifth lens element has an aspheric object-side surface and an aspheric image-side surface. The sixth lens element has a concave image-side surface at a paraxial region, wherein the image-side surface thereof has a convex shape at an off-axis region, and both surfaces thereof are aspheric. The photographing lens assembly has a total of six lens elements with refractive power.

22 Claims, 13 Drawing Sheets

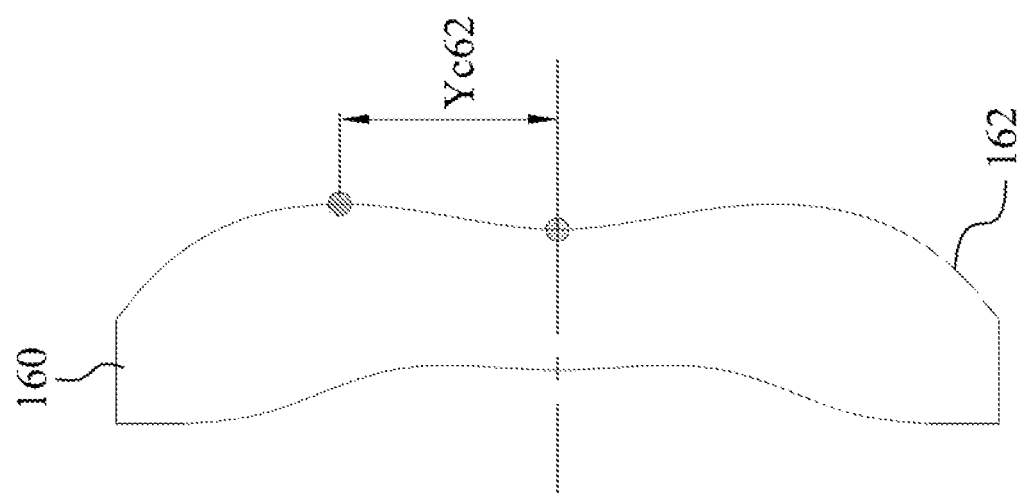

PHOTOGRAPHING LENS ASSEMBLY

RELATED APPLICATIONS

The application claims priority to Taiwan Application Serial Number 102114858, filed Apr. 25, 2013, which is herein incorporated by reference.

BACKGROUND

1. Technical Field

The present disclosure relates to a photographing lens assembly. More particularly, the present disclosure relates to a miniaturized photographing lens assembly applicable to electronic products.

2. Description of Related Art

In recent years, with the popularity of mobile products having camera functionalities, a demand for miniaturized optical systems has been increasing. A photosensitive sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and the optical systems have gradually evolved toward a field of higher megapixels, there is an increasing demand for better image quality.

A conventional optical system employed in a portable electronic product, as shown in the U.S. Pat. No. 7,869,142 and U.S. Pat. No. 8,000,031, mainly adopts a structure of four lens elements or five lens elements. Due to the popularity of mobile products with high-end specifications, such as smart phones, Tablet PC and PDAs (Personal Digital Assistants), requirements of higher megapixels and better image quality have been increasing rapidly. However, the conventional optical systems cannot satisfy the requirements of high-end optical systems with camera functionalities.

A conventional optical system with six lens elements, such as the one shown in the U.S. Pat. No. 8,390,940 B2, has a drastic curvature change for its fifth lens element. The arrangement of axial distance between every lens element is thereby not favorable for reducing the total track length. It is also not favorable for effectively correcting and controlling the aberration of the photographing lens assembly which might result into worse image quality.

SUMMARY

According to one aspect of the present disclosure, a photographing lens assembly in order from an object side to an image side, includes a first lens element, a second lens element, a third lens element, a fourth lens element, a fifth lens element and a sixth lens element. The first lens element with positive refractive power has a convex object-side surface at a paraxial region thereof. The second lens element has refractive power. The third lens element has refractive power. The fourth lens element with refractive power has a concave object-side surface at a paraxial region thereof and a convex image-side surface at a paraxial region thereof. The fifth lens element has refractive power, wherein both of an object-side surface and an image-side surface of the fifth lens element are aspheric. The sixth lens element with refractive power has a concave image-side surface at a paraxial region thereof, wherein the image-side surface of the sixth lens element has a convex shape at an off-axis region thereof, and both of an object-side surface and the image-side surface of the sixth lens element are aspheric. The photographing lens assembly has a total of six lens elements with refractive power. When a focal length of the photographing lens assembly is f, a curvature radius of the object-side surface of the fifth lens element is R9, and a curvature radius of the image-side surface of the fifth lens element is R10, the following relationship is satisfied:

$$|f/R9|+|f/R10|<1.1.$$

According to another aspect of the present disclosure, a photographing lens assembly includes, in order from an object side to an image side, a first lens element, a second lens element, a third lens element, a fourth lens element, a fifth lens element and a sixth lens element. The first lens element with positive refractive power has a convex object-side surface at a paraxial region thereof. The second lens element has refractive power. The third lens element has refractive power. The fourth lens element with refractive power has a concave object-side surface at a paraxial region thereof and a convex image-side surface at a paraxial region thereof. The fifth lens element has negative refractive power, wherein both of an object-side surface and an image-side surface of the fifth lens element are aspheric. The sixth lens element with negative refractive power has a concave image-side surface at a paraxial region thereof, wherein the image-side surface of the sixth lens element has a convex shape at an off-axis region thereof, and both of an object-side surface and the image-side surface of the sixth lens element are aspheric. The photographing lens assembly has a total of six lens elements with refractive power. When a focal length of the photographing lens assembly is f, a curvature radius of the object-side surface of the fifth lens element is R9, a curvature radius of the image-side surface of the fifth lens element is R10, an axial distance between the first lens element and the second lens element is T12, and an axial distance between the second lens element and the third lens element is T23, the following relationships are satisfied:

$$|f/R9|+|f/R10|<1.5; \text{ and}$$

$$0 \leq T12/T23 < 0.40$$

BRIEF DESCRIPTION OF THE DRAWINGS

The disclosure can be more fully understood by reading the following detailed description of the embodiment, with reference made to the accompanying drawings as follows:

FIG. 13 shows Yc62 of the sixth lens element of the photographing lens assembly according to the 1st embodiment of the present disclosure.

DETAILED DESCRIPTION

Figure 1:
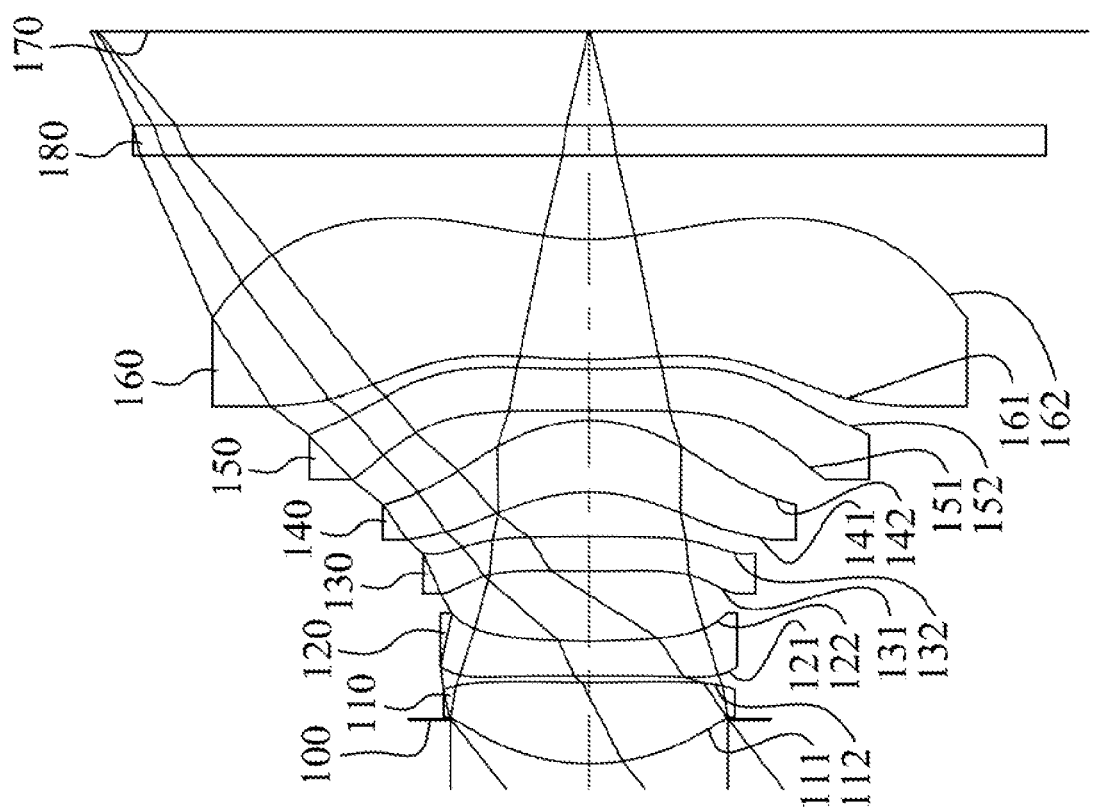
FIG. 1 is a schematic view of a photographing lens assembly according to the 1st embodiment of the present disclosure.

A photographing lens assembly in order from an object side to an image side, includes a first lens element, a second lens element, a third lens element, a fourth lens element, a fifth lens element and a sixth lens element. The photographing lens assembly has a total of six lens elements with refractive power.

The first lens element with positive refractive power has a convex object-side surface at a paraxial region thereof. Therefore, it is favorable for adjusting the positive refractive power of the first lens element and reducing the total track length of the photographing lens assembly.

The second lens element can have negative refractive power and a concave image-side surface at a paraxial region thereof, so that it is favorable for correcting the aberration generated by the first lens element.

The fourth lens element can have positive refractive power, and has a concave object-side surface at a paraxial region thereof and a convex image-side surface at a paraxial region thereof. Therefore, it is favorable for balancing the distribution of positive refractive power so as to avoid overloading the refractive power on one single lens element resulting in excessive spherical aberrations. It is also favorable for effectively correcting the astigmatism.

The fifth lens element can have negative refractive power, so that the Petzval sum of the photographing lens assembly can be corrected effectively to improve the flatness of the image plane.

The sixth lens element can have negative refractive power, a convex object-side surface at a paraxial region thereof and has a concave image-side surface at a paraxial region thereof, wherein the image-side surface of the sixth lens element has a convex shape at an off-axis region thereof. Therefore, a principal point of the photographing lens assembly can be positioned away from the image plane for effectively reducing a back focal length thereof so as to further reduce the total track length thereof. The surface shape of the sixth lens element can also effectively reduce the incident angle of the off-axis and further correct the aberration of the off-axis.

When a focal length of the photographing lens assembly is f, a curvature radius of the object-side surface of the fifth lens element is R9, and a curvature 3 radius of the image-side surface of the fifth lens element is R10, the following relationship is satisfied: $|f/R9|+|f/R10|<1.5$. Therefore, by taking the fifth lens element with weak curvature as the lens element which corrects the aberration of the photographing lens assembly, it is thereby favorable for effectively reducing the axial distance between each lens element so as to reduce the total track length and maintain the image quality. Preferably, the following relationship is satisfied: $|f/R9|+|f/R10|<1.1$.

When an axial distance between the first lens element and the second lens element is T12, and an axial distance between the second lens element and the third lens element is T23, the following relationship is satisfied: $0 \leq T12/T23<0.40$. Therefore, it is favorable for properly adjusting the axial distance between the lens elements so as to increase the manufacturing yield rate. Preferably, the following relationship is satisfied: $0 \leq T12/T23<0.2$.

When a central thickness of the second lens element is CT2, and a central thickness of the third lens element is CT3, the following relationships are satisfied: $CT2<0.3$ mm; and $CT3<0.3$ mm. Therefore, it is favorable for reducing the total track length of the photographing lens assembly.

When the focal length of the photographing lens assembly is f, a curvature radius of the object-side surface of the third lens element is R5, and a curvature radius of the image-side surface of the third lens element is R6, the following relationship is satisfied: $|f/R5|+|f/R6|<1.3$. By such an arrangement, the surface shape of the third lens element is favorable for correcting the astigmatism and the spherical aberration of the photographing lens assembly. Preferably, the following relationship is satisfied: $|f/R5|+|f/R6|<1.0$.

The aforementioned photographing lens assembly further includes a stop, such as an aperture stop, wherein an axial distance between the stop and the image-side surface of the sixth lens element is SD, and an axial distance between the object-side surface of the first lens element and the image-side surface of the sixth lens element is TD, the following relationship is satisfied: $0.85<SD/TD<1.05$. Therefore, it is favorable for enhancing the telecentric effect of the photographing lens assembly.

When an Abbe number of the second lens element is V2, an Abbe number of the fifth lens element is V5, and an Abbe number of the sixth lens element is V6, the following relationship is satisfied: $V2+V5-V6<0$. Accordingly, the chromatic aberration of the photographing lens assembly can be corrected.

When a vertical distance between a non-axial critical point on the image-side surface of the sixth lens element and an optical axis is Yc62, and the axial distance between the object-side surface of the first lens element and the image-side surface of the sixth lens element is TD, the following relationship is satisfied: $0.20<Yc62/TD<0.70$. Accordingly, it is favorable for correcting the aberration of the off-axis and reducing the total track length of the photographing lens assembly so as to keep a compact size thereof.

When a curvature radius of the object-side surface of the first lens element is R1, and a curvature radius of the image-side surface of the first lens element is R2, the following relationship is satisfied: $-0.2<R1/R2<0.5$. By such an arrangement, it is favorable for reducing the spherical aberration and the astigmatism. It is also favorable for reducing the total track length of the photographing lens assembly by properly adjusting the positive refractive power of the first lens element.

When the axial distance between the object-side surface of the first lens element and the image-side surface of the sixth lens element is TD, and a vertical distance between a maximum effective diameter position on the image-side surface of the sixth lens element and the optical axis is SD62, the following relationship is satisfied: 1.0<TD/SD62<1.6. Accordingly, it is favorable for maintaining a proper external diameter and reducing the total track length so as to keep a compact size thereof.

When the focal length of the photographing lens assembly is f, and a focal length of the fifth lens element is f5, the following relationship is satisfied: −0.7<f/f5<0.2. Therefore, it is favorable for correcting the Petzval sum of the photographing lens assembly to improve the flatness of the image plane.

When the focal length of the photographing lens assembly is f, a curvature radius of the object-side surface of the second lens element is R3, and a curvature radius of the image-side surface of the second lens element is R4, the following relationship is satisfied: |f/R3|+|f/R4|<2.0. Therefore, it is favorable for correcting the aberration of the first lens element.

In the photographing lens assembly of the disclosure, the lens elements can be made of plastic or glass material. When the lens elements are made of glass material, the distribution of the refractive power of the photographing lens assembly can be more flexible to design. When the lens elements are made of plastic material, the manufacturing cost thereof can be reduced. Furthermore, surfaces of each lens element can be arranged to be aspheric, since the aspheric surface of the lens element is easy to form a shape other than spherical surface so as to have more controllable variables for eliminating the aberration thereof, and to further reduce the required number of the lens elements. Thus, the total track length of the photographing lens assembly can be effectively reduced.

In the photographing lens assembly of the present disclosure, each of an object-side surface at a paraxial region thereof and an image-side surface at a paraxial region thereof of every lens element has a paraxial region thereof and an off-axis region thereof. The paraxial region thereof refers to the region of the surface where light rays travel close to an optical axis and the off-axis region thereof refers to the region of the surface where light rays travel away from the optical axis. Particularly, when the lens element has a convex surface, it indicates that the surface is convex at the paraxial region thereof; and when the lens element has a concave surface, it indicates that the surface is concave at the paraxial region thereof.

In the photographing lens assembly of the disclosure, the photographing lens assembly can include at least one stop, such as an aperture stop, a glare stop or a field stop. Said glare stop or said field stop is for eliminating the stray light and thereby improving the image resolution thereof.

In the present photographing lens assembly, an aperture stop can be configured as a front stop or a middle stop. A front stop disposed between an object and the first lens element can provide a longer distance between an exit pupil of the system and an image plane and thereby improves the image-sensing efficiency of an image sensor. A middle stop disposed between the first lens element and the image plane is favorable for enlarging the field of view of the system and thereby provides a wider field of view for the same.

In the photographing lens assembly of the disclosure, a critical point is a non-axial point of the lens surface where its tangent is perpendicular to the optical axis.

In the photographing lens assembly of the present disclosure, the photographing lens assembly is featured with good correction ability and high image quality, and can be applied to 3D (three-dimensional) image capturing applications, in products such as digital cameras, mobile devices and tablets.

According to the above description of the present disclosure, the following 1st-6th specific embodiments are provided for further explanation.

1st Embodiment

Figure 2:
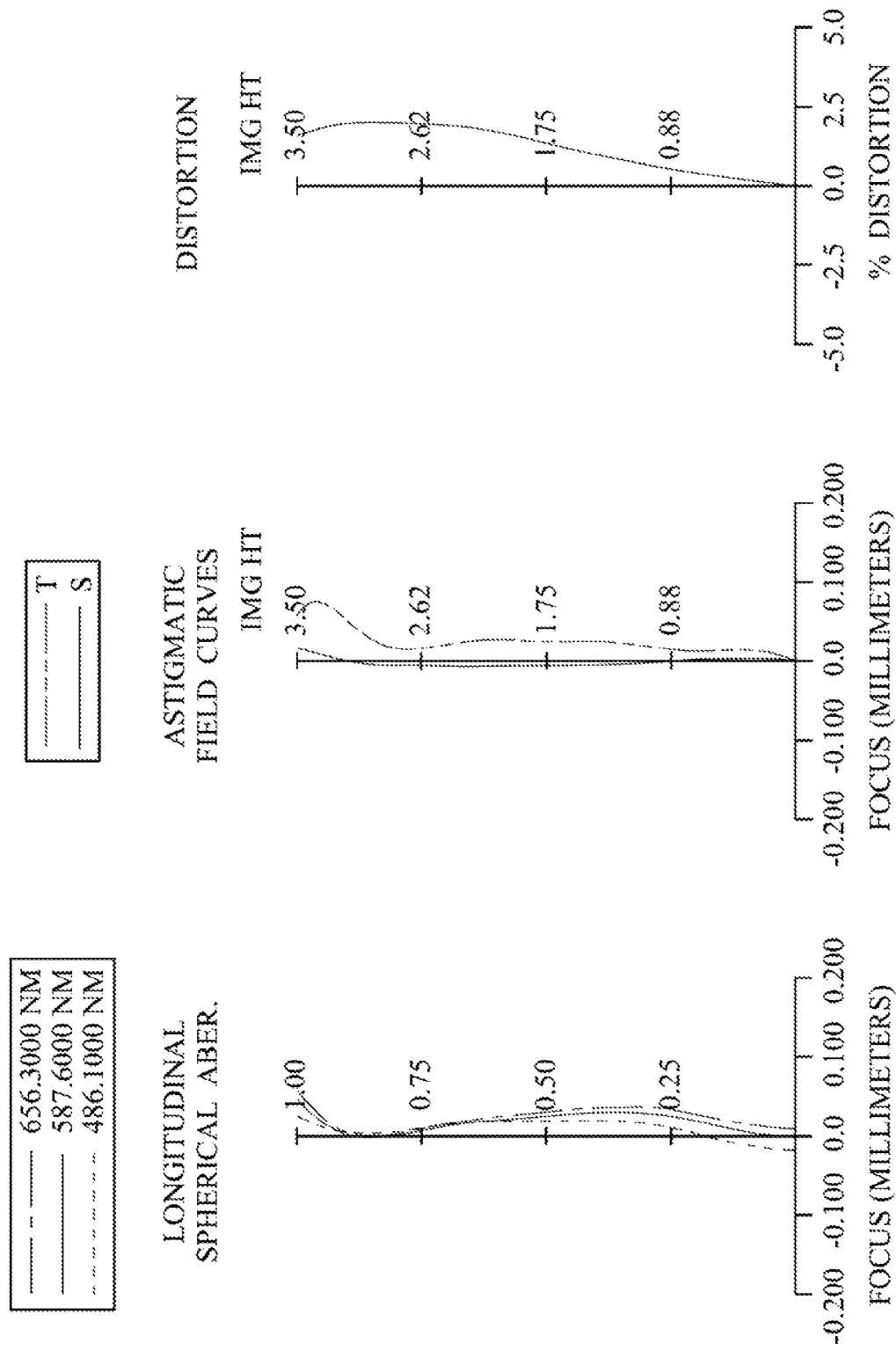
FIG. 2 shows, in order from left to right, spherical aberration curves, astigmatic field curves and a distortion curve of the photographing lens assembly according to the 1st embodiment.

FIG. 1 is a schematic view of a photographing lens assembly according to the 1st embodiment of the present disclosure. FIG. 2 shows, in order from left to right, spherical aberration curves, astigmatic field curves and a distortion curve of the photographing lens assembly according to the 1st embodiment. In FIG. 1, the photographing lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 180 and an image plane 170, wherein the photographing lens assembly has a total of six lens elements (110-160) with refractive power.

The first lens element 110 with positive refractive power has a convex object-side surface 111 at a paraxial region thereof and a concave image-side surface 112 at a paraxial region thereof, which are both aspheric, and the first lens element 110 is made of plastic material.

The second lens element 120 with negative refractive power has a convex object-side surface 121 at a paraxial region thereof and a concave image-side surface 122 at a paraxial region thereof, which are both aspheric, and the second lens element 120 is made of plastic material.

The third lens element 130 with positive refractive power has a convex object-side surface 131 at a paraxial region thereof and a convex image-side surface 132 at a paraxial region thereof, which are both aspheric, and the third lens element 130 is made of plastic material.

The fourth lens element 140 with positive refractive power has a concave object-side surface 141 at a paraxial region thereof and a convex image-side surface 142 at a paraxial region thereof, which are both aspheric, and the fourth lens element 140 is made of plastic material.

The fifth lens element 150 with negative refractive power has a concave object-side surface 151 at a paraxial region thereof and a concave image-side surface 152 at a paraxial region thereof, which are both aspheric, and the fifth lens element 150 is made of plastic material.

The sixth lens element 160 with negative refractive power has a convex object-side surface 161 at a paraxial region thereof and a concave image-side surface 162 at a paraxial region thereof, which are both aspheric, and the sixth lens element 160 is made of plastic material, wherein the image-side surface 162 of the sixth lens element 160 has a convex shape at an off-axis region thereof.

The IR-cut filter 180 is made of glass and located between the sixth lens element 160 and the image plane 170, and will not affect the focal length of the photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the photographing lens assembly according to the 1st embodiment, when a focal length of the photographing lens assembly is f, an f-number of the photographing lens assembly is Fno, and half of the maximal field of view of the photographing lens assembly is HFOV, these parameters have the following values: f=4.33 mm; Fno=2.20; and HFOV=38.4 degrees.

In the photographing lens assembly according to the 1st embodiment, when an Abbe number of the second lens element 120 is V2, an Abbe number of the fifth lens element 150 is V5, and an Abbe number of the sixth lens element 160 is V6, the following relationship is satisfied: V2+V5−V6=−8.7.

In the photographing lens assembly according to the 1st embodiment, when an axial distance between the first lens element 110 and the second lens element 120 is T12, and an axial distance between the second lens element 120 and the third lens element 130 is T23, the following relationship is satisfied: T12/T23=0.10.

In the photographing lens assembly according to the 1st embodiment, when a curvature radius of the object-side surface 111 of the first lens element 110 is R1, and a curvature radius of the image-side surface 112 of the first lens element 110 is R2, the following relationship is satisfied: R1/R2=0.18.

In the photographing lens assembly according to the 1st embodiment, when the focal length of the photographing lens assembly is f, a curvature radius of the object-side surface 121 of the second lens element 120 is R3, a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the object-side surface 151 of the fifth lens element 150 is R9, and a curvature radius of the image-side surface 152 of the fifth lens element 150 is R10, the following relationships are satisfied: |f/R3|+|f/R4|=1.00; |f/R5|+|f/R6|=0.41; and |f/R9|+|f/R10|=0.57.

In the photographing lens assembly according to the 1st embodiment, when the focal length of the photographing lens assembly is f, and a focal length of the fifth lens element 150 is f5, the following relationship is satisfied: f/f5=−0.37.

In the photographing lens assembly according to the 1st embodiment, when an axial distance between the object-side surface 111 of the first lens element 110 and the image-side surface 162 of the sixth lens element 160 is TD, and a vertical distance between a maximum effective diameter position on the image-side surface 162 of the sixth lens element 160 and the optical axis is SD62, the following relationship is satisfied: TD/SD62=1.39.

In the photographing lens assembly according to the 1st embodiment, the aperture stop 100 is disposed between an object and the first lens element 110, wherein an axial distance between the aperture stop 100 and the image-side surface 162 of the sixth lens element 160 is SD, and the axial distance between the object-side surface 111 of the first lens element 110 and the image-side surface 162 of the sixth lens element 160 is TD, the following relationship is satisfied: SD/TD=0.91.

FIG. 13 shows Yc62 of the sixth lens element 160 of the photographing lens assembly according to the 1st embodiment. In FIG. 13, when a vertical distance between a non-axial critical point on the image-side surface 162 of the sixth lens element 160 and the optical axis is Yc62, and the axial distance between the object-side surface 111 of the first lens element 110 and the image-side surface 162 of the sixth lens element 160 is TD, the following relationship is satisfied: Yc62/TD=0.36.

The detailed optical data of the 1st embodiment are shown in Table 1 and the aspheric surface data are shown in Table 2 below.

TABLE 1

1st Embodiment
f = 4.33 mm, Fno = 2.20, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.316 | | | | |
| 2 | Lens 1 | 1.557 | ASP | 0.573 | Plastic | 1.544 | 55.9 | 3.41 |
| 3 | | 8.490 | ASP | 0.050 | | | | |
| 4 | Lens 2 | 27.832 | ASP | 0.240 | Plastic | 1.639 | 23.5 | −9.85 |
| 5 | | 5.118 | ASP | 0.504 | | | | |
| 6 | Lens 3 | 12.838 | ASP | 0.243 | Plastic | 1.544 | 55.9 | 19.41 |
| 7 | | −59.099 | ASP | 0.311 | | | | |
| 8 | Lens 4 | −1.281 | ASP | 0.515 | Plastic | 1.544 | 55.9 | 7.17 |
| 9 | | −1.101 | ASP | 0.070 | | | | |
| 10 | Lens 5 | −74.465 | ASP | 0.289 | Plastic | 1.639 | 23.5 | −11.82 |
| 11 | | 8.415 | ASP | 0.070 | | | | |
| 12 | Lens 6 | 3.525 | ASP | 0.852 | Plastic | 1.535 | 55.7 | −9.64 |
| 13 | | 1.918 | ASP | 0.600 | | | | |
| 14 | IR-cut filter | Plano | | 0.210 | Glass | 1.517 | 64.2 | — |
| 15 | | Plano | | 0.673 | | | | |
| 16 | Image | Plano | | — | | | | |

Note:
Reference wavelength is 587.8 nm (d-line).

TABLE 2

Aspheric Coefficients

| Surface # | 2 | 3 | 4 | 5 | 6 | 7 |
|---|---|---|---|---|---|---|
| k = | 9.3272E−01 | −5.3270E+00 | −1.0000E+00 | 4.9301E−01 | −1.0000E+00 | 1.0000E+00 |
| A4 = | −3.9869E−02 | −1.4031E−01 | −1.6073E−01 | −3.2046E−02 | −1.2134E−01 | −4.7016E−02 |
| A6 = | 5.1337E−02 | 3.8775E−02 | 1.8381E−01 | 1.1053E−01 | −3.0255E−01 | −2.2807E−01 |
| A8 = | −2.1676E−01 | 2.2345E−01 | 2.0253E−01 | 2.1538E−01 | 9.0921E−01 | 5.9006E−01 |
| A10 = | 2.6458E−01 | −4.5296E−01 | −6.5445E−01 | −6.6411E−01 | −2.0145E+00 | −1.0313E+00 |
| A12 = | −1.6567E−01 | 3.2085E−01 | 6.5152E−01 | 7.5688E−01 | 2.0337E+00 | 9.2931E−01 |
| A14 = | −6.0752E−03 | −8.4438E−02 | −2.0658E−01 | −2.5156E−01 | −7.0667E−01 | −3.5019E−01 |
| A16 = | | | | | 1.5012E−02 | 3.9849E−02 |

| Surface # | 8 | 9 | 10 | 11 | 12 | 13 |
|---|---|---|---|---|---|---|
| k = | −4.4832E+00 | −1.3152E+00 | −9.9997E−01 | −1.5351E+01 | −7.2176E+01 | −1.1097E+01 |
| A4 = | −1.2625E−01 | −4.3552E−02 | −1.6292E−02 | −5.2171E−02 | −7.2027E−02 | −5.5700E−02 |
| A6 = | 2.1130E−01 | 2.0279E−01 | −5.6972E−02 | −4.3345E−02 | −3.1041E−02 | 1.3864E−02 |
| A8 = | −8.6695E−02 | −3.8363E−01 | 1.9967E−02 | 2.7415E−02 | 3.0443E−02 | −1.7188E−03 |
| A10 = | 1.8006E−02 | 4.3982E−01 | −2.4518E−03 | −8.5818E−03 | −8.3737E−03 | −3.0286E−04 |
| A12 = | −9.0861E−03 | −2.5156E−01 | 1.2728E−04 | 2.4376E−03 | 1.0403E−03 | 1.3307E−04 |
| A14 = | 2.4233E−03 | 6.8256E−02 | 2.9457E−05 | −4.5205E−04 | −5.2446E−05 | −1.7358E−05 |
| A16 = | | −7.0175E−03 | | 3.2433E−05 | 2.9656E−07 | 8.0744E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
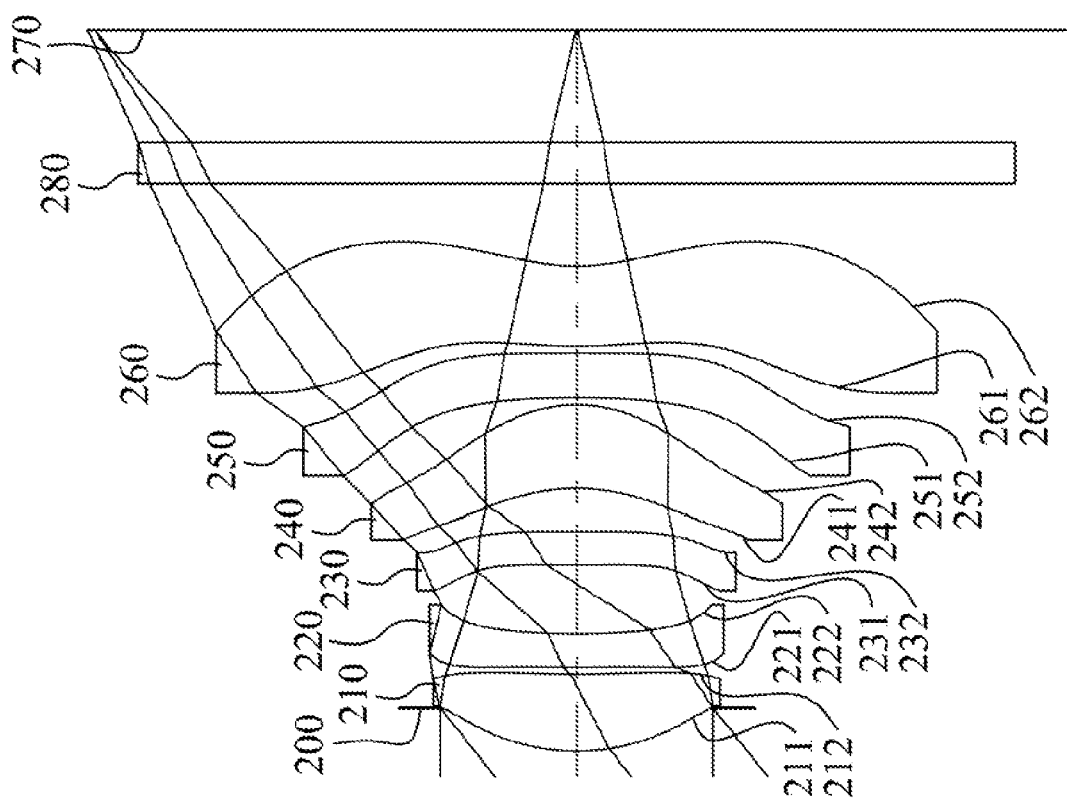
FIG. 3 is a schematic view of a photographing lens assembly according to the 2nd embodiment of the present disclosure.
Figure 4:
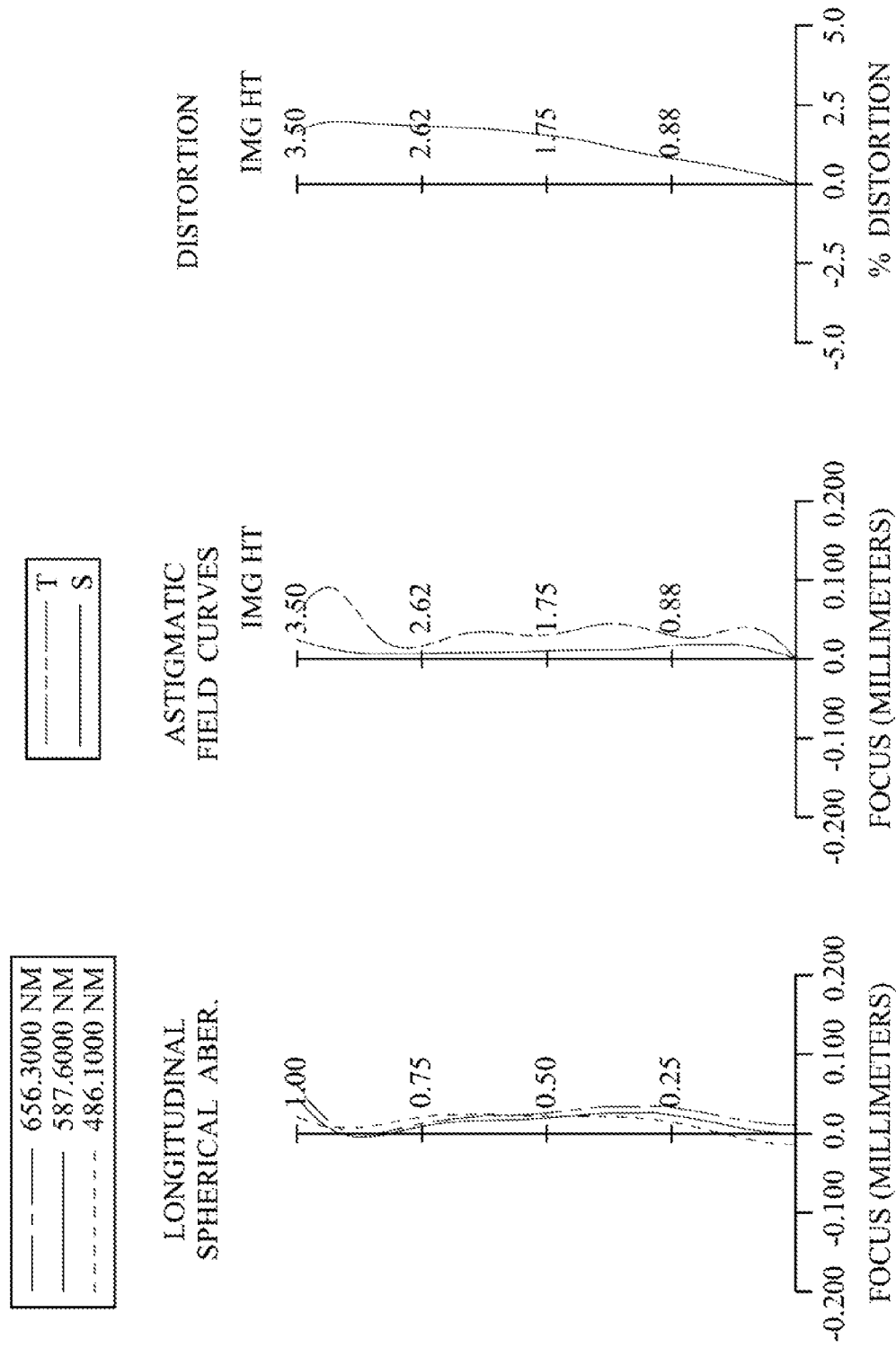
FIG. 4 shows, in order from left to right, spherical aberration curves, astigmatic field curves and a distortion curve of the photographing lens assembly according to the 2nd embodiment.

FIG. 3 is a schematic view of a photographing lens assembly according to the 2nd embodiment of the present disclosure. FIG. 4 shows, in order from left to right, spherical aberration curves, astigmatic field curves and a distortion curve of the photographing lens assembly according to the 2nd embodiment. In FIG. 3, the photographing lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 280 and an image plane 270, wherein the photographing lens assembly has a total of six lens elements (210-260) with refractive power.

The first lens element 210 with positive refractive power has a convex object-side surface 211 at a paraxial region thereof and a concave image-side surface 212 at a paraxial region thereof, which are both aspheric, and the first lens element 210 is made of plastic material.

The second lens element 220 with negative refractive power has a convex object-side surface 221 at a paraxial region thereof and a concave image-side surface 222 at a paraxial region thereof, which are both aspheric, and the second lens element 220 is made of plastic material.

The third lens element 230 with positive refractive power has a convex object-side surface 231 at a paraxial region thereof and a convex image-side surface 232 at a paraxial region thereof, which are both aspheric, and the third lens element 230 is made of plastic material.

The fourth lens element 240 with positive refractive power has a concave object-side surface 241 at a paraxial region thereof and a convex image-side surface 242 at a paraxial region thereof, which are both aspheric, and the fourth lens element 240 is made of plastic material.

The fifth lens element 250 with negative refractive power has a concave object-side surface 251 at a paraxial region thereof and a convex image-side surface 252 at a paraxial region thereof, which are both aspheric, and the fifth lens element 250 is made of plastic material.

The sixth lens element 260 with negative refractive power has a convex object-side surface 261 at a paraxial region thereof and a concave image-side surface 262 at a paraxial region thereof, which are both aspheric, and the sixth lens element 260 is made of plastic material, wherein the image-side surface 262 of the sixth lens element 260 has a convex shape at an off-axis region thereof.

The IR-cut filter 280 is made of glass and located between the sixth lens element 260 and the image plane 270, and will not affect the focal length of the photographing lens assembly.

The detailed optical data of the 2nd embodiment are shown in Table 3 and the aspheric surface data are shown in Table 4 below.

TABLE 3

2nd Embodiment
f = 4.32 mm, Fno = 2.18, HFOV = 38.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.313 | | | | |

TABLE 3-continued

2nd Embodiment
f = 4.32 mm, Fno = 2.18, HFOV = 38.5 deg.

| Surface # | | Curvature Radius | | Thickness | Material | Index | Abbe # | Focal Length |
|---|---|---|---|---|---|---|---|---|
| 2 | Lens 1 | 1.567 | ASP | 0.558 | Plastic | 1.557 | 54.5 | 3.63 |
| 3 | | 6.053 | ASP | 0.050 | | | | |
| 4 | Lens 2 | 15.659 | ASP | 0.240 | Plastic | 1.650 | 21.4 | −12.39 |
| 5 | | 5.286 | ASP | 0.504 | | | | |
| 6 | Lens 3 | 19.306 | ASP | 0.243 | Plastic | 1.544 | 55.9 | 31.87 |
| 7 | | −169.712 | ASP | 0.310 | | | | |
| 8 | Lens 4 | −1.497 | ASP | 0.614 | Plastic | 1.544 | 55.9 | 3.91 |
| 9 | | −1.006 | ASP | 0.050 | | | | |
| 10 | Lens 5 | −6.323 | ASP | 0.320 | Plastic | 1.650 | 21.4 | −10.06 |
| 11 | | −199.708 | ASP | 0.050 | | | | |
| 12 | Lens 6 | 3.210 | ASP | 0.587 | Plastic | 1.535 | 55.7 | −5.98 |
| 13 | | 1.500 | ASP | 0.600 | | | | |
| 14 | IR-cut filter | Plano | | 0.300 | Glass | 1.517 | 64.2 | — |
| 15 | | Plano | | 0.816 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | 9.8628E−01 | −1.9849E+01 | −1.0000E+00 | 2.7038E+00 | −1.8438E+01 | 1.0000E+00 |
| A4 = | −4.1069E−02 | −1.4027E−01 | −1.5767E−01 | −2.8801E−02 | −1.3527E−01 | −8.4441E−02 |
| A6 = | 4.6882E−02 | 3.8793E−02 | 1.8204E−01 | 1.2279E−01 | −3.1149E−01 | −2.1380E−01 |
| A8 = | −2.1642E−01 | 2.1748E−01 | 2.0587E−01 | 2.0905E−01 | 9.2547E−01 | 5.8078E−01 |
| A10 = | 2.6198E−01 | −4.5056E−01 | −6.5533E−01 | −6.7832E−01 | −2.0184E+00 | −1.0310E+00 |
| A12 = | −1.6567E−01 | 3.2434E−01 | 6.5107E−01 | 7.6234E−01 | 2.0323E+00 | 9.3262E−01 |
| A14 = | −5.9070E−03 | −8.5958E−02 | −2.0723E−01 | −2.5157E−01 | −7.0665E−01 | −3.4961E−01 |
| A16 = | | | | | 1.5028E−02 | 3.9846E−02 |

| Surface # | 8 | 9 | 10 | 11 | 12 | 13 |
|---|---|---|---|---|---|---|
| k = | −4.9382E+00 | −1.3152E+00 | −9.9883E−01 | −1.5351E+01 | −8.9987E+01 | −1.0477E+01 |
| A4 = | −1.5243E−01 | −3.2689E−02 | −4.6294E−03 | −5.2178E−02 | −7.1443E−02 | −6.0206E−02 |
| A6 = | 2.0345E−01 | 1.9516E−01 | −5.6021E−02 | −4.0444E−02 | −3.1052E−02 | 1.4028E−02 |
| A8 = | −8.0682E−02 | −3.8299E−01 | 1.9968E−02 | 2.7401E−02 | 3.0432E−02 | −1.6668E−03 |
| A10 = | 1.8006E−02 | 4.4027E−01 | −1.9917E−03 | −8.6445E−03 | −8.3744E−03 | −3.0296E−04 |
| A12 = | −7.5382E−03 | −2.5160E−01 | 9.0698E−05 | 2.4376E−03 | 1.0400E−03 | 1.3320E−04 |
| A14 = | 2.8016E−04 | 6.8177E−02 | −2.6043E−09 | −4.5336E−04 | −5.2418E−05 | −1.7383E−05 |
| A16 = | | −7.0840E−03 | | 3.3209E−05 | 3.1990E−07 | 8.0729E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following relationships:

| 2nd Embodiment | | | |
|---|---|---|---|
| f [mm] | 4.32 | |f/R5| + |f/R6| | 0.25 |
| Fno | 2.18 | |f/R9| + |f/R10| | 0.70 |
| HFOV [deg.] | 38.5 | f/f5 | −0.43 |
| V2 + V5 − V6 | −12.9 | TD/SD62 | 1.35 |
| T12/T23 | 0.10 | SD/TD | 0.91 |
| R1/R2 | 0.26 | Yc62/TD | 0.37 |
| |f/R3| + |f/R4| | 1.09 | | |

3rd Embodiment

Figure 5:
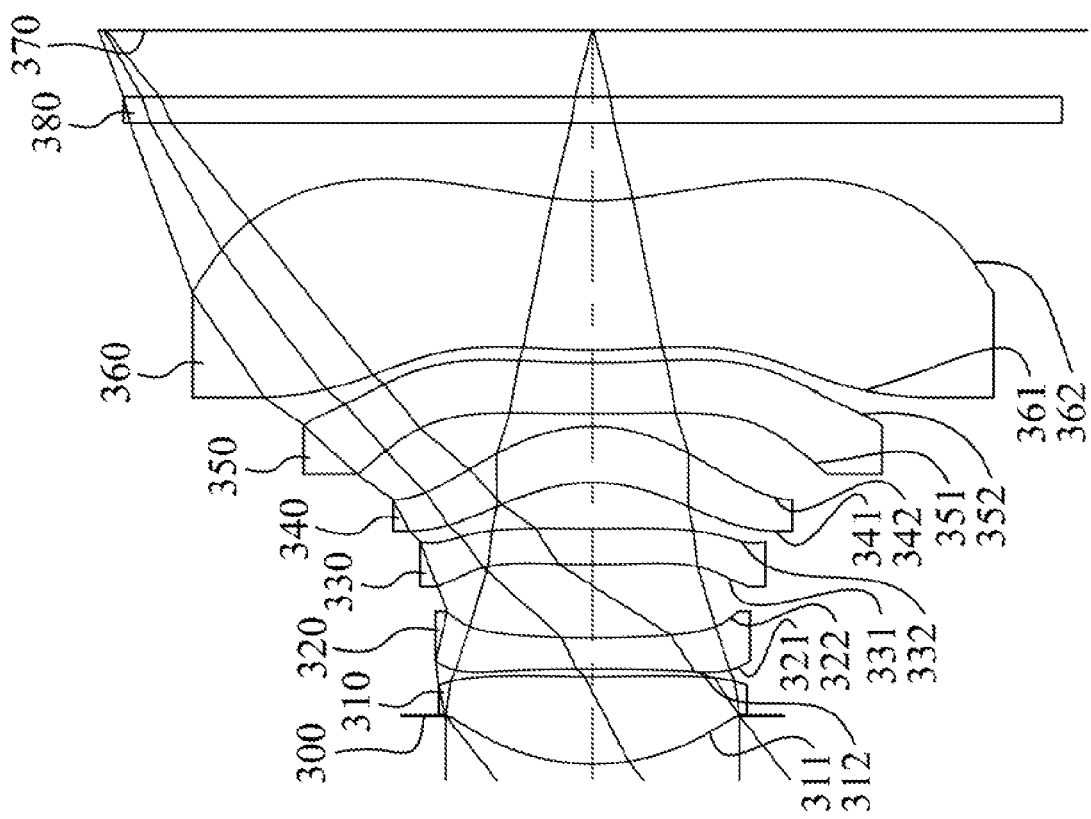
FIG. 5 is a schematic view of a photographing lens assembly according to the 3rd embodiment of the present disclosure.
Figure 6:
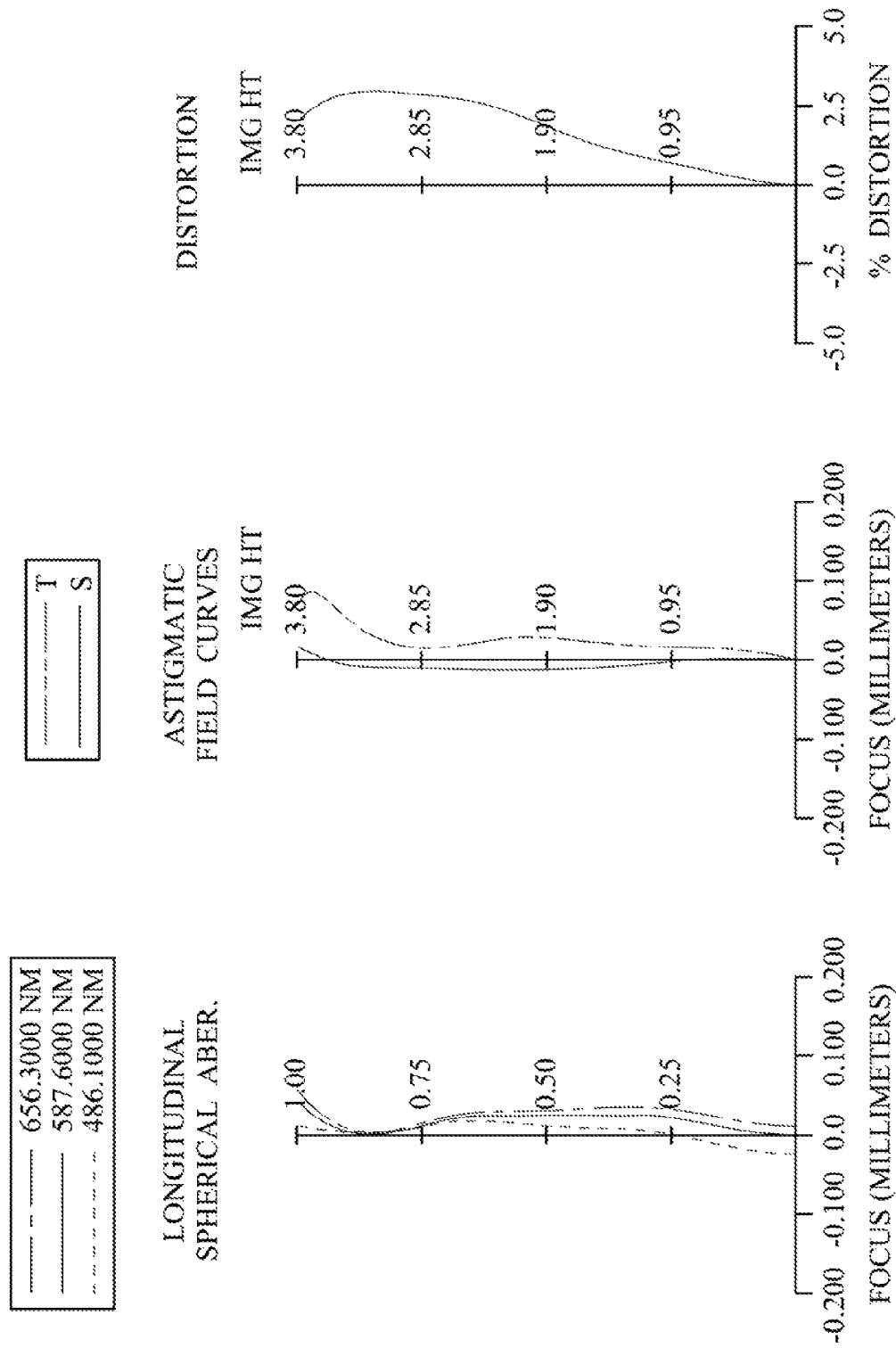
FIG. 6 shows, in order from left to right, spherical aberration curves, astigmatic field curves and a distortion curve of the photographing lens assembly according to the 3rd embodiment.

FIG. 5 is a schematic view of a photographing lens assembly according to the 3rd embodiment of the present disclosure. FIG. 6 shows, in order from left to right, spherical aberration curves, astigmatic field curves and a distortion curve of the photographing lens assembly according to the 3rd embodiment. In FIG. 5, the photographing lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 380 and an image plane 370, wherein the photographing lens assembly has a total of six lens elements (310-360) with refractive power.

The first lens element 310 with positive refractive power has a convex object-side surface 311 at a paraxial region thereof and a concave image-side surface 312 at a paraxial region thereof, which are both aspheric, and the first lens element 310 is made of plastic material.

The second lens element 320 with negative refractive power has a concave object-side surface 321 at a paraxial region thereof and a concave image-side surface 322 at a paraxial region thereof, which are both aspheric, and the second lens element 320 is made of plastic material.

The third lens element 330 with positive refractive power has a convex object-side surface 331 at a paraxial region thereof and a concave image-side surface 332 at a paraxial region thereof, which are both aspheric, and the third lens element 330 is made of plastic material.

The fourth lens element 340 with positive refractive power has a concave object-side surface 341 at a paraxial region thereof and a convex image-side surface 342 at a paraxial region thereof, which are both aspheric, and the fourth lens element 340 is made of plastic material.

The fifth lens element 350 with negative refractive power has a convex object-side surface 351 at a paraxial region thereof and a concave image-side surface 352 at a paraxial region thereof, which are both aspheric, and the fifth lens element 350 is made of plastic material.

The sixth lens element 360 with negative refractive power has a convex object-side surface 361 at a paraxial region thereof and a concave image-side surface 362 at a paraxial region thereof, which are both aspheric, and the sixth lens element 360 is made of plastic material, wherein the image-side surface 362 of the sixth lens element 360 has a convex shape at an off-axis region thereof.

The IR-cut filter 380 is made of glass, and located between the sixth lens element 360 and the image plane 370, and will not affect the focal length of the photographing lens assembly.

The detailed optical data of the 3rd embodiment are shown in Table 5 and the aspheric surface data are shown in Table 6 below.

TABLE 5

3rd Embodiment
f = 4.68 mm, Fno = 2.05, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.374 | | | | |
| 2 | Lens 1 | 1.775 | ASP | 0.681 | Plastic | 1.544 | 55.9 | 3.82 |
| 3 | | 10.514 | ASP | 0.058 | | | | |
| 4 | Lens 2 | −94.943 | ASP | 0.240 | Plastic | 1.640 | 23.3 | −12.38 |
| 5 | | 8.648 | ASP | 0.576 | | | | |
| 6 | Lens 3 | 7.979 | ASP | 0.278 | Plastic | 1.535 | 55.7 | 20.78 |
| 7 | | 27.917 | ASP | 0.355 | | | | |
| 8 | Lens 4 | −1.316 | ASP | 0.441 | Plastic | 1.544 | 55.9 | 15.11 |
| 9 | | −1.268 | ASP | 0.100 | | | | |
| 10 | Lens 5 | 19.876 | ASP | 0.392 | Plastic | 1.640 | 23.3 | −19.81 |
| 11 | | 7.680 | ASP | 0.100 | | | | |
| 12 | Lens 6 | 4.957 | ASP | 1.168 | Plastic | 1.544 | 55.9 | −12.50 |
| 13 | | 2.629 | ASP | 0.600 | | | | |
| 14 | IR-cut filter | Plano | | 0.200 | Glass | 1.517 | 64.2 | — |
| 15 | | Plano | | 0.525 | | | | |
| 16 | Image | Plano | | — | | | | |

Note:
Reference wavelength is 587.8 nm (d-line).

TABLE 6

Aspheric Coefficients

| Surface # | 2 | 3 | 4 | 5 | 6 | 7 |
|---|---|---|---|---|---|---|
| k = | 8.6595E−01 | −1.0000E+00 | −1.0000E+00 | −1.2444E+01 | −1.0000E+00 | 1.0000E+00 |
| A4 = | −2.4927E−02 | −9.3997E−02 | −1.1101E−01 | −2.5327E−02 | −8.9053E−02 | −4.8948E−02 |
| A6 = | 2.7010E−02 | 1.9888E−02 | 1.0701E−01 | 6.8321E−02 | −1.5125E−01 | −9.9286E−02 |
| A8 = | −8.6332E−02 | 8.5255E−02 | 7.6362E−02 | 8.5883E−02 | 3.6938E−01 | 2.2653E−01 |
| A10 = | 8.2241E−02 | −1.3302E−01 | −2.0156E−01 | −2.0915E−01 | −6.1896E−01 | −3.1114E−01 |
| A12 = | −3.8137E−02 | 7.3857E−02 | 1.5193E−01 | 1.7609E−01 | 4.6927E−01 | 2.1431E−01 |
| A14 = | −9.8618E−04 | −1.5758E−02 | −3.6330E−02 | −4.4335E−02 | −1.2454E−01 | −6.1643E−02 |
| A16 = | | | | | 2.0256E−03 | 5.3462E−03 |

| Surface # | 8 | 9 | 10 | 11 | 12 | 13 |
|---|---|---|---|---|---|---|
| k = | −2.8157E+00 | −1.3152E+00 | 0.0000E+00 | −1.5351E+01 | −9.7863E+01 | −1.1097E+01 |
| A4 = | −5.2320E−02 | −2.3325E−02 | −1.4709E−02 | −3.4950E−02 | −4.6718E−02 | −3.3119E−02 |
| A6 = | 1.1079E−01 | 1.0728E−01 | −3.1222E−02 | −2.1107E−02 | −1.5667E−02 | 6.6412E−03 |
| A8 = | −4.0593E−02 | −1.5028E−01 | 7.8411E−03 | 1.0632E−02 | 1.1936E−02 | −6.8545E−04 |
| A10 = | 5.4138E−03 | 1.3150E−01 | −7.2578E−04 | −2.5983E−03 | −2.5222E−03 | −9.1057E−05 |
| A12 = | −8.1280E−04 | −5.7970E−02 | 2.0323E−05 | 5.6111E−04 | 2.3898E−04 | 3.1415E−05 |
| A14 = | 2.1597E−04 | 1.1965E−02 | 1.5446E−05 | −7.9802E−05 | −9.2476E−06 | −3.1000E−06 |
| A16 = | | −8.7403E−04 | | 4.4032E−06 | 5.1991E−08 | 1.0659E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following relationships:

| 3rd Embodiment | | | |
|---|---|---|---|
| f [mm] | 4.68 | |f/R5| + |f/R6| | 0.75 |
| Fno | 2.05 | |f/R9| + |f/R10| | 0.85 |
| HFOV [deg.] | 38.4 | f/f5 | −0.24 |
| V2 + V5 − V6 | −9.3 | TD/SD62 | 1.41 |
| T12/T23 | 0.10 | SD/TD | 0.91 |
| R1/R2 | 0.17 | Yc62/TD | 0.36 |
| |f/R3| + |f/R4| | 0.59 | | |

4th Embodiment

Figure 7:
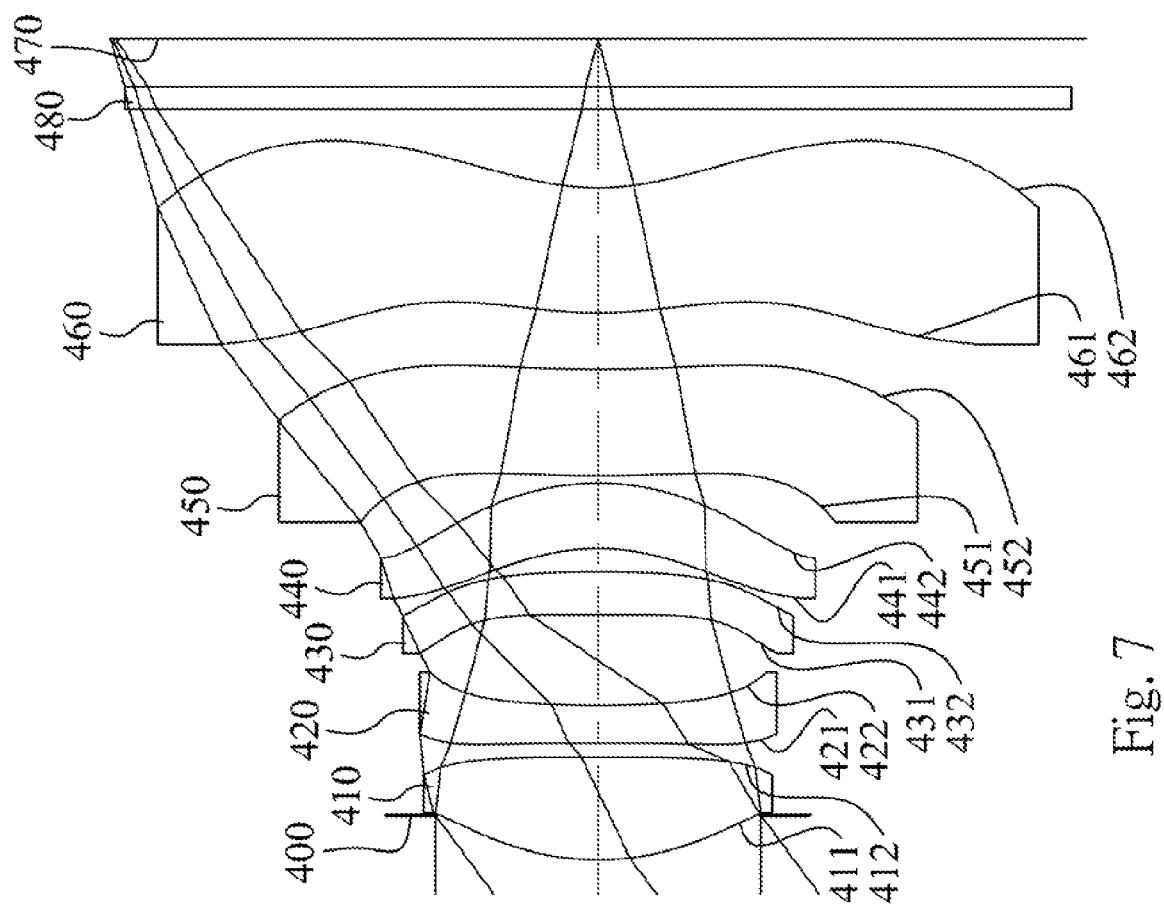
FIG. 7 is a schematic view of a photographing lens assembly according to the 4th embodiment of the present disclosure.
Figure 8:
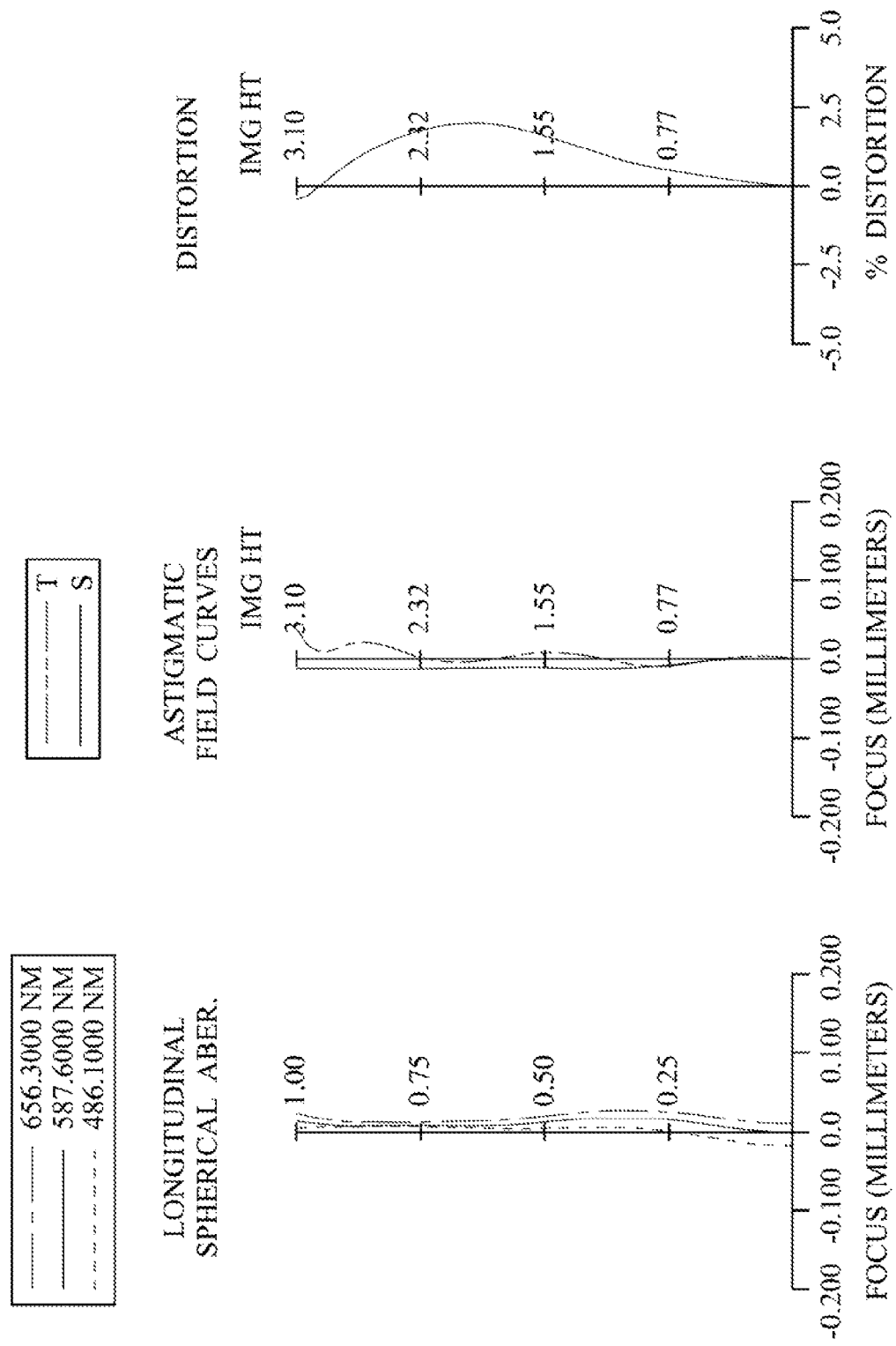
FIG. 8 shows, in order from left to right, spherical aberration curves, astigmatic field curves and a distortion curve of the photographing lens assembly according to the 4th embodiment.

FIG. 7 is a schematic view of a photographing lens assembly according to the 4th embodiment of the present disclosure. FIG. 8 shows, in order from left to right, spherical aberration curves, astigmatic field curves and a distortion curve of the photographing lens assembly according to the 4th embodiment. In FIG. 7, the photographing lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 480 and an image plane 470, wherein the photographing lens assembly has a total of six lens elements (410-460) with refractive power.

The first lens element 410 with positive refractive power has a convex object-side surface 411 at a paraxial region thereof and a concave image-side surface 412 at a paraxial region thereof, which are both aspheric, and the first lens element 410 is made of plastic material.

The second lens element 420 with negative refractive power has a planar object-side surface 421 at a paraxial region thereof and a concave image-side surface 422 at a paraxial region thereof, which are both aspheric, and the second lens element 420 is made of plastic material.

The third lens element 430 with positive refractive power has a convex object-side surface 431 at a paraxial region thereof and a convex image-side surface 432 at a paraxial region thereof, which are both aspheric, and the third lens element 430 is made of plastic material.

The fourth lens element 440 with negative refractive power has a concave object-side surface 441 at a paraxial region thereof and a convex image-side surface 442 at a paraxial region thereof, which are both aspheric, and the fourth lens element 440 is made of plastic material.

The fifth lens element 450 with positive refractive power has a convex object-side surface 451 at a paraxial region thereof and a concave image-side surface 452 at a paraxial region thereof, which are both aspheric, and the fifth lens element 450 is made of plastic material.

The sixth lens element 460 with negative refractive power has a convex object-side surface 461 at a paraxial region thereof and a concave image-side surface 462 at a paraxial region thereof, which are both aspheric, and the sixth lens element 460 is made of plastic material, wherein the image-side surface 462 of the sixth lens element 460 has a convex shape at an off-axis region thereof.

The IR-cut filter 480 is made of glass and located between the sixth lens element 460 and the image plane 470, and will not affect the focal length of the photographing lens assembly.

The detailed optical data of the 4th embodiment are shown in Table 7 and the aspheric surface data are shown in Table 8 below.

TABLE 7

4th Embodiment
f = 4.16 mm, Fno = 2.00, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.281 | | | | |
| 2 | Lens 1 | 1.769 | ASP | 0.655 | Plastic | 1.544 | 55.9 | 3.36 |
| 3 | | 47.484 | ASP | 0.091 | | | | |
| 4 | Lens 2 | ∞ | ASP | 0.240 | Plastic | 1.650 | 21.4 | −9.50 |
| 5 | | 6.173 | ASP | 0.576 | | | | |
| 6 | Lens 3 | 45.282 | ASP | 0.278 | Plastic | 1.535 | 55.7 | 14.24 |
| 7 | | −9.140 | ASP | 0.149 | | | | |
| 8 | Lens 4 | −1.428 | ASP | 0.414 | Plastic | 1.544 | 55.9 | −74.17 |
| 9 | | −1.632 | ASP | 0.050 | | | | |
| 10 | Lens 5 | 8.207 | ASP | 0.677 | Plastic | 1.640 | 23.3 | 119.53 |
| 11 | | 8.898 | ASP | 0.366 | | | | |
| 12 | Lens 6 | 2.735 | ASP | 0.798 | Plastic | 1.544 | 55.9 | −9.21 |
| 13 | | 1.588 | ASP | 0.500 | | | | |
| 14 | IR-cut filter | Plano | | 0.145 | Glass | 1.517 | 64.2 | — |
| 15 | | Plano | | 0.309 | | | | |
| 16 | Image | Plano | | — | | | | |

Note:
Reference wavelength is 587.6 nm (d-line).

TABLE 8

| Aspheric Coefficients | | | | | | |
|---|---|---|---|---|---|---|
| Surface # | 2 | 3 | 4 | 5 | 6 | 7 |
| k = | 7.6959E−01 | −1.0000E+00 | −1.0000E+00 | −6.0142E−01 | −1.0000E+00 | 1.0000E+00 |
| A4 = | −3.1518E−02 | −8.8104E−02 | −9.8199E−02 | −2.1818E−02 | −9.6770E−02 | −6.8286E−02 |
| A6 = | 2.3387E−02 | 1.4089E−02 | 1.2202E−01 | 8.0340E−02 | −1.7494E−01 | −9.7574E−02 |
| A8 = | −9.2036E−02 | 7.8436E−02 | 7.8410E−02 | 9.8060E−02 | 3.6591E−01 | 2.2654E−01 |
| A10 = | 7.5600E−02 | −1.3768E−01 | −2.0487E−01 | −2.1220E−01 | −6.1887E−01 | −3.1298E−01 |
| A12 = | −3.8137E−02 | 7.6091E−02 | 1.4841E−01 | 1.7224E−01 | 4.7557E−01 | 2.1310E−01 |
| A14 = | −1.9669E−03 | −1.7082E−02 | −3.5062E−02 | −4.4335E−02 | −1.2389E−01 | −6.2006E−02 |
| A16 = | | | | | 3.4294E−03 | 5.9599E−03 |
| Surface # | 8 | 9 | 10 | 11 | 12 | 13 |
| k = | −3.6537E+00 | −1.3152E+00 | 3.0000E+00 | 3.0000E+00 | −2.3802E+01 | −5.7418E+00 |
| A4 = | −5.1461E−02 | −4.4411E−02 | −4.8618E−02 | −1.8233E−02 | −4.7238E−02 | −3.9440E−02 |
| A6 = | 1.1058E−01 | 9.8402E−02 | −2.3695E−02 | −2.1576E−02 | −1.5199E−02 | 6.6496E−03 |
| A8 = | −4.3495E−02 | −1.4951E−01 | 7.8411E−03 | 1.0509E−02 | 1.1829E−02 | −5.8494E−04 |
| A10 = | 5.4138E−03 | 1.3260E−01 | −2.1486E−03 | −2.8010E−03 | −2.5357E−03 | −8.7412E−05 |
| A12 = | −1.1800E−03 | −5.7689E−02 | 7.2294E−04 | 5.6065E−04 | 2.4030E−04 | 2.9791E−05 |
| A14 = | 7.0880E−04 | 1.2050E−02 | −2.4832E−04 | −7.7504E−05 | −9.0166E−06 | −3.1700E−06 |
| A16 = | | −7.8394E−04 | | 4.5030E−06 | 4.3066E−08 | 1.2356E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following relationships:

| 4th Embodiment | | | |
|---|---|---|---|
| f [mm] | 4.16 | |f/R5| + |f/R6| | 0.55 |
| Fno | 2.00 | |f/R9| + |f/R10| | 0.97 |
| HFOV [deg.] | 36.8 | f/f5 | 0.03 |
| V2 + V5 − V6 | −11.2 | TD/SD62 | 1.53 |
| T12/T23 | 0.16 | SD/TD | 0.93 |
| R1/R2 | 0.04 | Yc62/TD | 0.40 |
| |f/R3| + |f/R4| | 0.67 | | |

5th Embodiment

Figure 9:
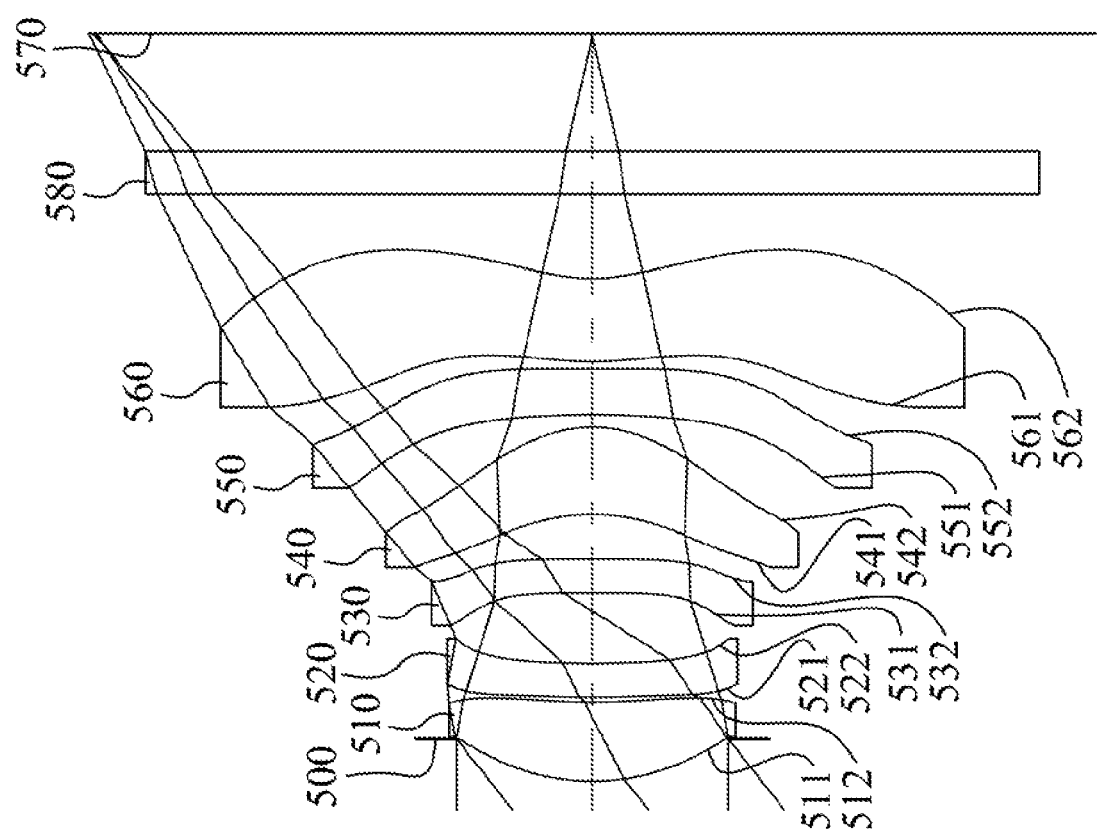
FIG. 9 is a schematic view of a photographing lens assembly according to the 5th embodiment of the present disclosure.
Figure 10:
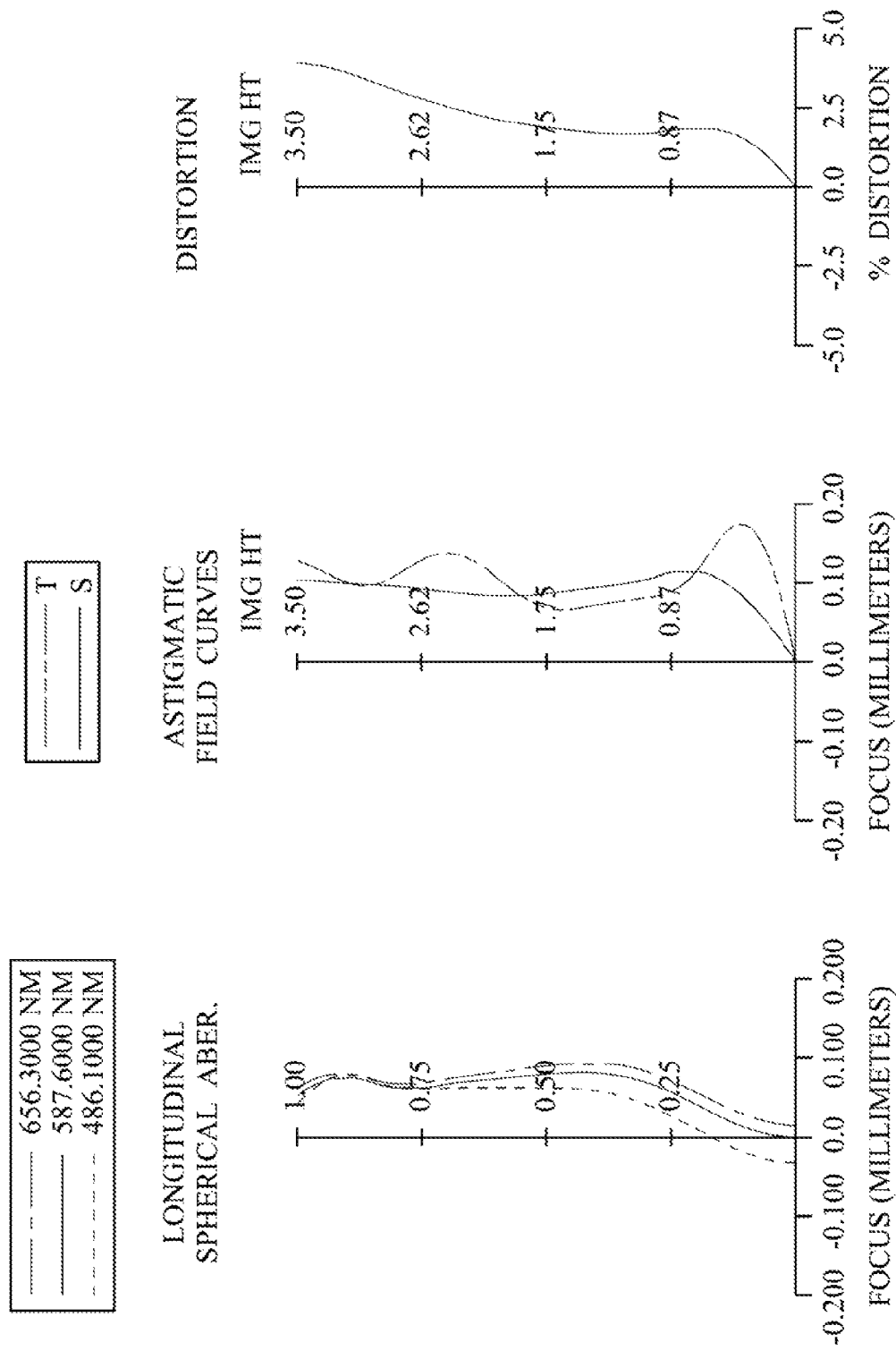
FIG. 10 shows, in order from left to right, spherical aberration curves, astigmatic field curves and a distortion curve of the photographing lens assembly according to the 5th embodiment.

FIG. 9 is a schematic view of a photographing lens assembly according to the 5th embodiment of the present disclosure. FIG. 10 shows, in order from left to right, spherical aberration curves, astigmatic field curves and a distortion curve of the photographing lens assembly according to the 5th embodiment. In FIG. 9, the photographing lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 580 and an image plane 570, wherein the photographing lens assembly has a total of six lens elements (510-560) with refractive power.

The first lens element 510 with positive refractive power has a convex object-side surface 511 at a paraxial region thereof and a concave image-side surface 512 at a paraxial region thereof, which are both aspheric, and the first lens element 510 is made of plastic material.

The second lens element 520 with negative refractive power has a convex object-side surface 521 at a paraxial region thereof and a concave image-side surface 522 at a paraxial region thereof, which are both aspheric, and the second lens element 520 is made of plastic material.

The third lens element 530 with negative refractive power has a concave object-side surface 531 at a paraxial region thereof and a convex image-side surface 532 at a paraxial region thereof, which are both aspheric, and the third lens element 530 is made of plastic material.

The fourth lens element 540 with positive refractive power has a concave object-side surface 541 at a paraxial region thereof and a convex image-side surface 542 at a paraxial region thereof, which are both aspheric, and the fourth lens element 540 is made of plastic material.

The fifth lens element 550 with negative refractive power has a concave object-side surface 551 at a paraxial region thereof and a concave image-side surface 552 at a paraxial region thereof, which are both aspheric, and the fifth lens element 550 is made of plastic material.

The sixth lens element 560 with negative refractive power has a convex object-side surface 561 at a paraxial region thereof and a concave image-side surface 562 at a paraxial region thereof, which are both aspheric, and the sixth lens element 560 is made of plastic material, wherein the image-side surface 562 of the sixth lens element 560 has a convex shape at an off-axis region thereof.

The IR-cut filter 580 is made of glass and located between the sixth lens element 560 and the image plane 570, and will not affect the focal length of the photographing lens assembly.

The detailed optical data of the 5th embodiment are shown in Table 9 and the aspheric surface data are shown in Table 10 below.

TABLE 9

5th Embodiment
f = 4.18 mm, Fno = 2.18, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.298 | | | | |
| 2 | Lens 1 | 1.567 | ASP | 0.559 | Plastic | 1.544 | 55.9 | 4.40 |
| 3 | | 3.965 | ASP | 0.036 | | | | |
| 4 | Lens 2 | 6.790 | ASP | 0.233 | Plastic | 1.650 | 21.4 | −61.07 |
| 5 | | 5.719 | ASP | 0.503 | | | | |
| 6 | Lens 3 | −93.000 | ASP | 0.240 | Plastic | 1.614 | 25.6 | −379.10 |
| 7 | | −155.000 | ASP | 0.311 | | | | |
| 8 | Lens 4 | −1.366 | ASP | 0.620 | Plastic | 1.544 | 55.9 | 3.68 |
| 9 | | −0.942 | ASP | 0.088 | | | | |
| 10 | Lens 5 | −6.312 | ASP | 0.320 | Plastic | 1.634 | 23.8 | −9.61 |
| 11 | | 177.000 | ASP | 0.051 | | | | |
| 12 | Lens 6 | 2.064 | ASP | 0.589 | Plastic | 1.535 | 55.7 | −6.83 |
| 13 | | 1.188 | ASP | 0.600 | | | | |
| 14 | IR-cut filter | Plano | | 0.300 | Glass | 1.517 | 64.2 | — |
| 15 | | Plano | | 0.835 | | | | |
| 16 | Image | Plano | | — | | | | |

Note:
Reference wavelength is 587.6 nm (d-line).

TABLE 10

Aspheric Coefficients

| Surface # | 2 | 3 | 4 | 5 | 6 | 7 |
|---|---|---|---|---|---|---|
| k = | 1.0044E+00 | −1.5655E+01 | −2.0000E+01 | −6.3765E+00 | −7.6774E+00 | −2.0000E+01 |
| A4 = | −3.8986E−02 | −1.4008E−01 | −1.5715E−01 | −2.3945E−02 | −1.6281E−01 | −9.8686E−02 |
| A6 = | 4.1929E−02 | 3.5532E−02 | 1.8080E−01 | 1.1607E−01 | −3.1034E−01 | −2.1200E−01 |
| A8 = | −2.1194E−01 | 2.1361E−01 | 2.0588E−01 | 2.0905E−01 | 8.6831E−01 | 5.8060E−01 |
| A10 = | 2.5837E−01 | −4.5667E−01 | −6.5629E−01 | −6.7862E−01 | −1.9825E+00 | −1.0297E+00 |
| A12 = | −1.6567E−01 | 3.2434E−01 | 6.5102E−01 | 7.6313E−01 | 2.0514E+00 | 9.3308E−01 |
| A14 = | −5.9039E−03 | −8.6034E−02 | −2.1046E−01 | −2.5157E−01 | −7.0658E−01 | −3.4824E−01 |
| A16 = | | | | | 1.5015E−02 | 3.9843E−02 |

| Surface # | 8 | 9 | 10 | 11 | 12 | 13 |
|---|---|---|---|---|---|---|
| k = | −4.9300E+00 | −1.3143E+00 | −1.1064E+00 | −1.5351E+01 | −5.6674E+01 | −1.0483E+01 |
| A4 = | −1.5188E−01 | −3.3776E−02 | 1.6513E−02 | −5.2301E−02 | −7.2869E−02 | −5.8180E−02 |
| A6 = | 2.0527E−01 | 1.9571E−01 | −5.6054E−02 | −4.0085E−02 | −3.1060E−02 | 1.4031E−02 |
| A8 = | −7.9702E−02 | −3.7993E−01 | 1.9960E−02 | 2.7397E−02 | 3.0432E−02 | −1.6592E−03 |
| A10 = | 1.8006E−02 | 4.4027E−01 | −2.5251E−03 | −8.6811E−03 | −8.3777E−03 | −3.0301E−04 |
| A12 = | −7.3140E−03 | −2.5228E−01 | 9.0069E−05 | 2.4376E−03 | 1.0400E−03 | 1.3317E−04 |
| A14 = | 3.0253E−04 | 6.8179E−02 | −1.5435E−08 | −4.5388E−04 | −5.2390E−05 | −1.7384E−05 |
| A16 = | | −7.0829E−03 | | 3.3211E−05 | 3.3105E−07 | 8.0751E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following relationships:

| 5th Embodiment | | | |
|---|---|---|---|
| f [mm] | 4.18 | |f/R5| + |f/R6| | 0.07 |
| Fno | 2.18 | |f/R9| + |f/R10| | 0.69 |
| HFOV [deg.] | 38.5 | f/f5 | −0.44 |
| V2 + V5 − V6 | −10.5 | TD/SD62 | 1.35 |

-continued

| 5th Embodiment | | | |
|---|---|---|---|
| T12/T23 | 0.07 | SD/TD | 0.92 |
| R1/R2 | 0.40 | Yc62/TD | 0.38 |
| |f/R3| + |f/R4| | 1.35 | | |

6th Embodiment

Figure 11:
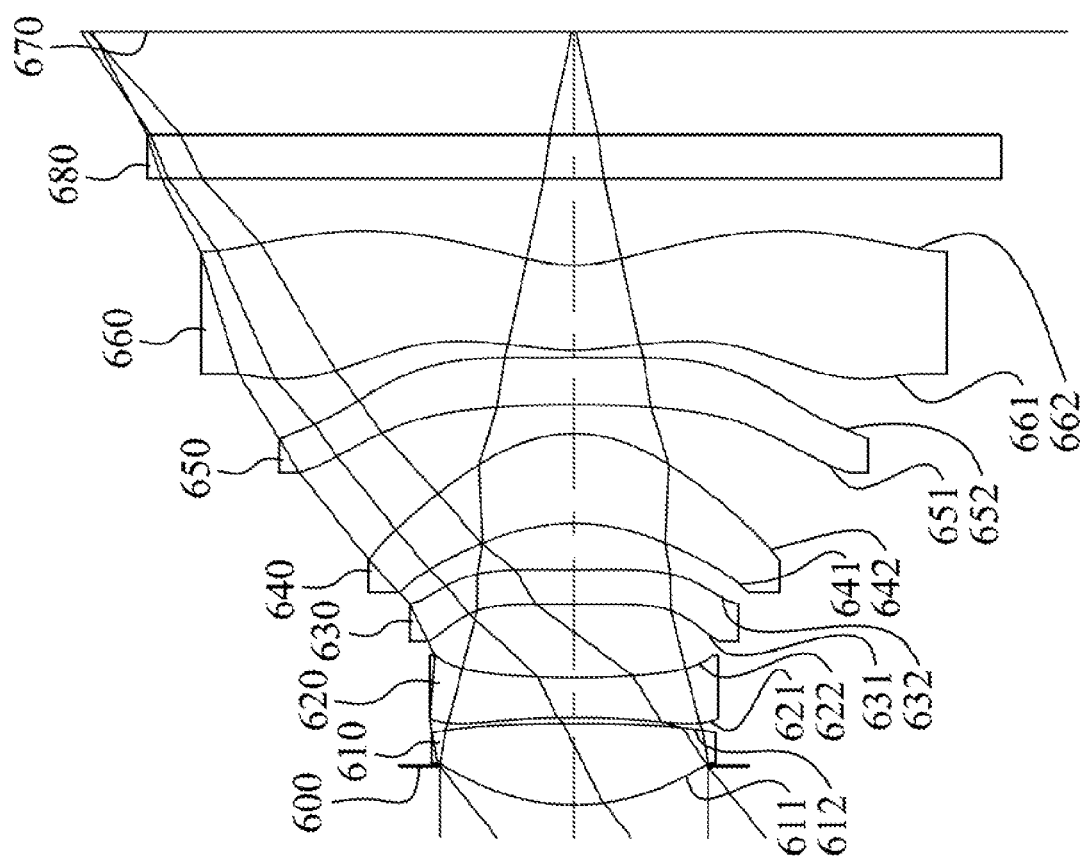
FIG. 11 is a schematic view of a photographing lens assembly according to the 6th embodiment of the present disclosure.
Figure 12:
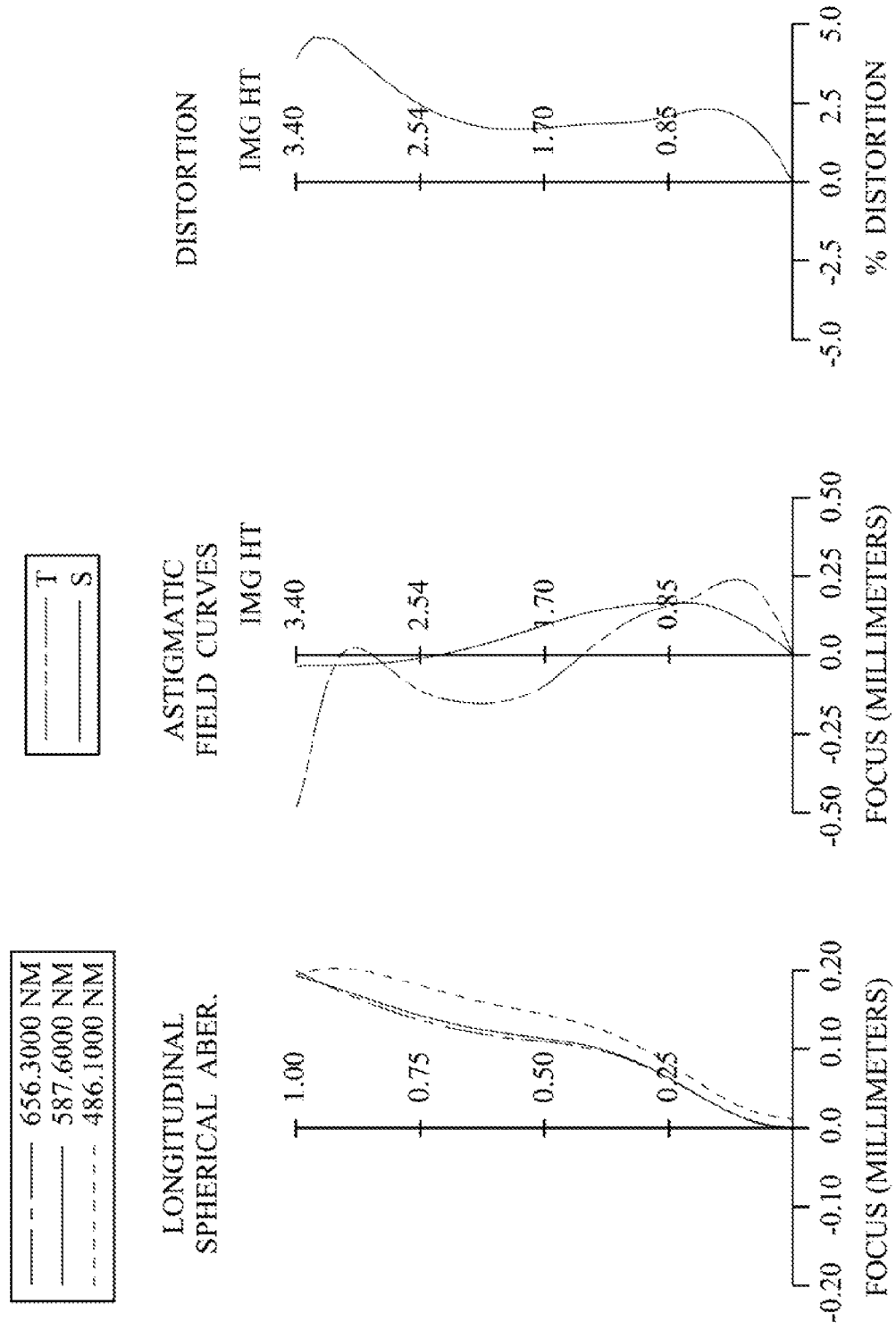
FIG. 12 shows, in order from left to right, spherical aberration curves, astigmatic field curves and a distortion curve of the photographing lens assembly according to the 6th embodiment.

FIG. 11 is a schematic view of a photographing lens assembly according to the 6th embodiment of the present disclosure. FIG. 12 shows, in order from left to right, spherical aberration curves, astigmatic field curves and a distortion curve of the photographing lens assembly according to the 6th embodiment. In FIG. 11, the photographing lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 680 and an image plane 670, wherein the photographing lens assembly has a total of six lens elements (610-660) with refractive power.

The first lens element 610 with positive refractive power has a convex object-side surface 611 at a paraxial region thereof and a convex image-side surface 612 at a paraxial region thereof, which are both aspheric, and the first lens element 610 is made of plastic material.

The second lens element 620 with negative refractive power has a concave object-side surface 621 at a paraxial region thereof and a concave image-side surface 622 at a paraxial region thereof, which are both aspheric, and the second lens element 620 is made of plastic material.

The third lens element 630 with negative refractive power has a convex object-side surface 631 at a paraxial region thereof and a concave image-side surface 632 at a paraxial region thereof, which are both aspheric, and the third lens element 630 is made of plastic material.

The fourth lens element 640 with positive refractive power has a concave object-side surface 641 at a paraxial region thereof and a convex image-side surface 642 at a paraxial region thereof, which are both aspheric, and the fourth lens element 640 is made of plastic material.

The fifth lens element 650 with negative refractive power has a concave object-side surface 651 at a paraxial region thereof and a concave image-side surface 652 at a paraxial region thereof, which are both aspheric, and the fifth lens element 650 is made of plastic material.

The sixth lens element 660 with negative refractive power has a convex object-side surface 661 at a paraxial region thereof and a concave image-side surface 662 at a paraxial region thereof, which are both aspheric, and the sixth lens element 660 is made of plastic material, wherein the image-side surface 662 of the sixth lens element 660 has a convex shape at an off-axis region thereof.

The IR-cut filter 680 is made of glass and located between the sixth lens element 660 and the image plane 670, and will not affect the focal length of the photographing lens assembly.

The detailed optical data of the 6th embodiment are shown in Table 11 and the aspheric surface data are shown in Table 12 below.

TABLE 11

6th Embodiment
f = 4.03 mm, Fno = 2.18, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.268 | | | | |
| 2 | Lens 1 | 1.567 | ASP | 0.559 | Plastic | 1.544 | 55.9 | 2.82 |
| 3 | | −65.703 | ASP | 0.041 | | | | |
| 4 | Lens 2 | −8.324 | ASP | 0.279 | Plastic | 1.650 | 21.4 | −5.18 |
| 5 | | 5.719 | ASP | 0.503 | | | | |
| 6 | Lens 3 | 23.407 | ASP | 0.240 | Plastic | 1.614 | 25.6 | −395.39 |
| 7 | | 21.266 | ASP | 0.321 | | | | |
| 8 | Lens 4 | −1.401 | ASP | 0.620 | Plastic | 1.544 | 55.9 | 3.73 |
| 9 | | −0.959 | ASP | 0.200 | | | | |
| 10 | Lens 5 | −6.921 | ASP | 0.320 | Plastic | 1.634 | 23.8 | −9.59 |
| 11 | | 51.026 | ASP | 0.051 | | | | |
| 12 | Lens 6 | 1.556 | ASP | 0.589 | Plastic | 1.535 | 55.7 | −8.29 |
| 13 | | 1.000 | ASP | 0.600 | | | | |
| 14 | IR-cut filter | Plano | | 0.300 | Glass | 1.517 | 64.2 | — |
| 15 | | Plano | | 0.715 | | | | |
| 16 | Image | Plano | | — | | | | |

Note:
Reference wavelength is 587.8 nm (d-line).

TABLE 12

Aspheric Coefficients

| Surface # | 2 | 3 | 4 | 5 | 6 | 7 |
|---|---|---|---|---|---|---|
| k = | 1.0980E+00 | −2.0000E+01 | −2.0000E+01 | −1.3768E+01 | −3.2291E+00 | −2.0000E+01 |
| A4 = | −4.5211E−02 | −1.4001E−01 | −1.5715E−01 | −4.6731E−02 | −1.9420E−01 | −1.6097E−01 |
| A6 = | 3.5294E−02 | 9.2592E−02 | 2.3865E−01 | 1.3647E−01 | −3.1034E−01 | −2.1200E−01 |
| A8 = | −2.0877E−01 | 2.2030E−01 | 2.0588E−01 | 2.0905E−01 | 7.8752E−01 | 5.8060E−01 |
| A10 = | 2.4029E−01 | −4.7114E−01 | −6.6882E−01 | −6.7862E−01 | −1.9529E+00 | −1.0430E+00 |
| A12 = | −1.6567E−01 | 3.2434E−01 | 6.5102E−01 | 7.3957E−01 | 2.0842E+00 | 9.3308E−01 |
| A14 = | −5.9039E−03 | −8.6034E−02 | −2.1579E−01 | −2.5157E−01 | −7.0655E−01 | −3.4125E−01 |
| A16 = | | | | | 1.5015E−02 | 3.9840E−02 |

| Surface # | 8 | 9 | 10 | 11 | 12 | 13 |
|---|---|---|---|---|---|---|
| k = | −4.9300E+00 | −1.3143E+00 | −1.1080E+00 | −1.5351E+01 | −3.4822E+01 | −1.0071E+01 |
| A4 = | −1.5188E−01 | −3.3776E−02 | 2.6799E−02 | −5.2903E−02 | −7.3977E−02 | −5.5929E−02 |
| A6 = | 1.6056E−01 | 1.9571E−01 | −5.6097E−02 | −4.0519E−02 | −3.1060E−02 | 1.4031E−02 |

TABLE 12-continued

| Aspheric Coefficients | | | | | |
| --- | --- | --- | --- | --- | --- |
| A8 = | −7.9702E−02 | −4.0037E−01 | 1.9952E−02 | 2.7397E−02 | 3.0432E−02 | −1.5263E−03 |
| A10 = | 1.8006E−02 | 4.4027E−01 | −2.4628E−03 | −8.7080E−03 | −8.3350E−03 | −3.0284E−04 |
| A12 = | −7.3140E−03 | −2.4980E−01 | 9.0069E−05 | 2.4376E−03 | 1.0403E−03 | 1.3317E−04 |
| A14 = | 3.0253E−04 | 6.8178E−02 | −1.5360E−08 | −4.5172E−04 | −5.2007E−05 | −1.7384E−05 |
| A16 = | | −7.0831E−03 | | 3.3211E−05 | 1.3029E−07 | 8.0751E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following relationships:

| 6th Embodiment | | | |
| --- | --- | --- | --- |
| f [mm] | 4.03 | \|f/R5\| + \|f/R6\| | 0.36 |
| Fno | 2.18 | \|f/R9\| + \|f/R10\| | 0.66 |
| HFOV [deg.] | 38.3 | f/f5 | −0.42 |
| V2 + V5 − V6 | −10.5 | TD/SD62 | 1.45 |
| T12/T23 | 0.08 | SD/TD | 0.93 |
| R1/R2 | −0.02 | Yc62/TD | 0.39, 0.88 |
| \|f/R3\| + \|f/R4\| | 1.19 | | |

It is to be noted that TABLES 1-12 show different data of the different embodiments; however, the data of the different embodiments are obtained from experiments. Therefore, any optical system of the same structure is considered to be less than or equal to the scope of the present disclosure even if it uses different data. The embodiments depicted above and the appended drawings are exemplary and are not intended to limit the scope of the present disclosure.

What is claimed is:

1. A photographing lens assembly comprising, in order from an object side to an image side thereof:
   a first lens element with positive refractive power having a convex object-side surface at a paraxial region thereof;
   a second lens element having refractive power;
   a third lens element having refractive power;
   a fourth lens element with refractive power having a concave object-side surface at a paraxial region thereof and a convex image-side surface at a paraxial region thereof;
   a fifth lens element having refractive power, wherein both of an object-side surface and an image-side surface of the fifth lens element are aspheric; and
   a sixth lens element with refractive power having a concave image-side surface at a paraxial region thereof, wherein the it age-side surface of the sixth lens element has a convex shape at an off-axis region thereof, and both of an object-side surface and the image-side surface of the sixth lens element are aspheric;
   wherein the photographing lens assembly has a total of six lens elements with refractive power, there is a gap in a paraxial region between any two of the first lens element, the second lens element, the third lens element, the fourth lens element, the fifth lens element and the sixth lens element that are adjacent to each other, a focal length of the photographing lens assembly is f, a curvature radius of an object-side surface of the third lens element R5, a curvature radius of an image-side surface of the third lens element is R6, a curvature radius of the object-side surface of the fifth lens element is R9, a curvature radius of the image-side surface of the fifth lens element is R10, a focal length of the fifth lens element is f5, and the following relationships are satisfied:

$|f/R5|+|f/R6|<1.3;$ $|f/R9|+|f/R10|<1.1;$ and $-0.7<f/f5<0.2.$

2. The photographing lens assembly of claim 1, wherein the sixth lens element has negative refractive power.

3. The photographing lens assembly of claim 2, wherein the second lens element has negative refractive power.

4. The photographing lens assembly of claim 3, wherein a central thickness of the second lens element is CT2, a central thickness of the third lens element is CT3, and the following relationships are satisfied:

$CT2<0.3$ mm; and $CT3<0.3$ mm.

5. The photographing lens assembly of claim 3, further comprising:
   a stop located between an object and the first lens element, wherein an axial distance between the stop and the image-side surface of the sixth lens element is SD, an axial distance between the object-side surface of the first lens element and the image-side surface of the sixth lens element is TD, and the following relationship is satisfied:

$0.85<SD/TD<1.05.$

6. The photographing lens assembly of claim 3, wherein an Abbe number of the second lens element is V2, an Abbe number of the fifth lens element is V5, an Abbe number of the sixth lens element is V6, and the following relationship is satisfied:

$V2+V5-V6<0.$

7. The photographing lens assembly of claim 1, wherein a vertical distance between a non-axial critical point on the image-side surface of the sixth lens element and an optical axis is Yc62, an axial distance between the object-side surface of the first lens element and the image-side surface of the sixth lens element is TD, and the following relationship is satisfied:

$0.20<Yc62/TD<0.70.$

8. The photographing lens assembly of claim 7, wherein a curvature radius of the object-side surface of the first lens element is R1, a curvature radius of an image-side surface of the first lens element is R2, and the following relationship is satisfied:

$-0.2<R1/R2<0.5.$

9. The photographing lens assembly of claim 7, wherein the axial distance between the object-side surface of the first lens element and the image-side surface of the sixth lens element is TD, a vertical distance between a maximum effective diameter position on the image-side surface of the sixth lens element and the optical axis is SD62, and the following relationship is satisfied:

1.0<TD/SD62<1.6.

10. The photographing lens assembly of claim 7, wherein the object-side surface of the sixth lens element is convex at a paraxial region thereof.

11. The photographing lens assembly of claim 7, wherein the fourth lens element has positive refractive power.

12. The photographing lens assembly of claim 7, wherein the focal length of the photographing lens assembly is f, a curvature radius of an object-side surface of the second lens element is R3, a curvature radius of an image-side surface of the second lens element is R4, and the following relationship is satisfied:

|f/R3|+|f/R4|<2.0.

13. A photographing lens assembly comprising, in order from an object side to an image side thereof:
   a first lens element with positive refractive power having a convex object-side surface at a paraxial region thereof;
   a second lens element having refractive power;
   a third lens element having refractive power;
   a fourth lens element with refractive power having a concave object-side surface at a paraxial region thereof and a convex image-side surface at a paraxial region thereof;
   a fifth lens element having negative refractive power, wherein both of an object-side surface and an image-side surface of the fifth lens element are aspheric; and
   a sixth lens element with negative refractive power having a concave image-side surface at a paraxial region thereof, wherein the image-side surface of the sixth lens element has a convex shape at an off-axis region thereof, and both of an object-side surface and the image-side surface of the sixth lens element are aspheric;
   wherein the photographing lens assembly has a total of six lens elements with refractive power, there is a gap in a paraxial region between any two of the first lens element, the second lens element, the third lens element, the fourth lens element, the fifth lens element and the sixth lens element that are adjacent to each other, a focal length of the photographing lens assembly is f, a curvature radius of an object-side surface of the third lens element is R5, a curvature radius of an image-side surface of the third lens element is R6, a curvature radius of the object-side surface of the fifth lens element is R9, a curvature radius of the image-side surface of the fifth lens element is R10, an axial distance between the first lens element and the second lens element is T12, an axial distance between the second lens element and the third lens element is T23, and the following relationships are satisfied:

|f/R5|+|f/R6|<1.3;

|f/R9|+|f/R10|<1.5; and

0<T12/T23<0.40.

14. The photographing lens assembly of claim 13, wherein the object-side surface of the sixth lens element is convex at a paraxial region thereof.

15. The photographing lens assembly of claim 14, wherein an axial distance between the object-side surface of the first lens element and the image-side surface of the sixth lens element is TD, a vertical distance between a maximum effective diameter position on the image-side surface of the sixth lens element and the optical axis is SD62, and the following relationship is satisfied:

1.0<TD/SD62<1.6.

16. The photographing lens assembly of claim 14, wherein the focal length of the photographing lens assembly is f, a curvature radius of an object-side surface of the third lens element is R5, a curvature radius of an image-side surface of the third lens element is R6, and the following relationship is satisfied:

|f/R5|+|f/R6|<1.0.

17. The photographing lens assembly of claim 13, wherein a vertical distance between a non-axial critical point on the image-side surface of the sixth lens element and an optical axis is Yc62, an axial distance between the object-side surface of the first lens element and the image-side surface of the sixth lens element is TD, and the following relationship is satisfied:

0.20<Yc62/TD<0.70.

18. The photographing lens assembly of claim 13, further comprising:
   a stop located between an object and the first lens element, wherein an axial distance between the stop and the image-side surface of the sixth lens element is SD, an axial distance between the object-side surface of the first lens element and the image-side surface of the sixth lens element is TD, and the following relationship is satisfied:

0.85<SD/TD<1.05.

19. The photographing lens assembly of claim 18, wherein the axial distance between the first lens element and the second lens element is T12, the axial distance between the second lens element and the third lens element is T23, and the following relationship is satisfied:

0<T12/T23<0.2.

20. The photographing lens assembly of claim 18, wherein the second lens element has negative refractive power and the second lens element has a concave image-side surface at paraxial region thereof.

21. The photographing lens assembly of claim 18, wherein an Abbe number of the second lens element is V2, an Abbe number of the fifth lens element is V5, an Abbe number of the sixth lens element is V6, the following relationship is satisfied:

V2+V5−V6<0.

22. The photographing lens assembly of claim 18, wherein the fourth lens element has positive refractive power, the focal length of the photographing lens assembly is f, a focal length of the fifth lens element is f5, and the following relationship is satisfied:

−0.7<f/f5<0.

* * * * *

UNITED STATES PATENT AND TRADEMARK OFFICE
CERTIFICATE OF CORRECTION

PATENT NO.        : 9,019,626 B2             Page 1 of 1
APPLICATION NO.   : 13/888376
DATED             : April 28, 2015
INVENTOR(S)       : Dung-Yi Hsieh, Tsung-Han Tsai and Hsin-Hsuan Huang It is certified that error appears in the above-identified patent and that said Letters Patent is hereby corrected as shown below:

Claims

(1) In column 23, lines 54-56, claim 1 of the issued patent reads as "..., wherein the it age-side surface of the sixth lens element has a convex shape...", but it should read as "..., wherein the image-side surface of the sixth lens element has a convex shape...".

(2) In column 23, lines 65-67, claim 1 of the issued patent reads as "... a curvature radius of ... element R5, ...", but it should read as "... a curvature radius of ... element is R5, ...".

(3) In column 26, lines 11-14, claim 16 of the issued patent reads as "...a curvature radius of an object-side surface of the third lens element is R5, a curvature radius of an image-side surface of the third lens element is R6...", but it should read as "...the curvature radius of the object-side surface of the third lens element is R5, the curvature radius of the image-side surface of the third lens element is R6...".

Signed and Sealed this
Seventeenth Day of November, 2015

Michelle K. Lee
*Director of the United States Patent and Trademark Office*